(12) United States Patent
Katsuta et al.

(10) Patent No.: US 10,662,842 B2
(45) Date of Patent: May 26, 2020

(54) EXHAUST PURIFICATION DEVICE OF ENGINE, VEHICLE ENGINE INCLUDING EXHAUST PURIFICATION DEVICE, AND METHOD OF CONTROLLING ENGINE

(71) Applicant: Mazda Motor Corporation, Aki-gun, Hiroshima (JP)

(72) Inventors: Masato Katsuta, Aki-gun (JP);
Yasunori Uesugi, Hiroshima (JP);
Hiroshi Minamoto, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 52 days.

(21) Appl. No.: 16/108,699

(22) Filed: Aug. 22, 2018

(65) Prior Publication Data
US 2019/0093529 A1 Mar. 28, 2019

(30) Foreign Application Priority Data

Sep. 22, 2017 (JP) ................................ 2017-182187

(51) Int. Cl.
*F01N 3/10* (2006.01)
*F01N 3/029* (2006.01)
(Continued)

(52) U.S. Cl.
CPC ....... *F01N 3/0296* (2013.01); *B01D 53/9409* (2013.01); *B01D 53/9431* (2013.01); *B01D 53/9477* (2013.01); *B01D 53/9495* (2013.01); *F01N 3/103* (2013.01); *F01N 3/208* (2013.01); *F01N 3/2066* (2013.01); *F01N 9/00* (2013.01); *F02B 37/04* (2013.01); *F02B 39/10* (2013.01); *F02M 26/05* (2016.02);
(Continued)

(58) Field of Classification Search
CPC ........ F01N 3/103; F01N 3/208; F01N 3/0296; F01N 3/2066; F01N 9/00; F02B 39/10; B01D 53/9431
USPC .......................................................... 60/303
See application file for complete search history.

(56) References Cited

U.S. PATENT DOCUMENTS

2011/0061370 A1    3/2011   Aoyama et al.

FOREIGN PATENT DOCUMENTS

JP          2007016611 A      1/2007
JP          2009150271 A      7/2009
(Continued)

OTHER PUBLICATIONS

Japanese Patent Office, Office Action Issued in Application No. 2017182187, dated Mar. 5, 2019, 4 pages.

*Primary Examiner* — Jason D Shanske
(74) *Attorney, Agent, or Firm* — Alleman Hall Creasman & Tuttle LLP

(57) ABSTRACT

In an engine which includes an oxidation catalyst and an SCR catalyst in an exhaust passage, a first flow regulating control in which a control valve is controlled so as to decrease a flow rate of an exhaust gas which passes through the oxidation catalyst and the SCR catalyst is performed in a case where the oxidation catalyst is in a low temperature state at the time of performing deceleration fuel cut, and a second flow regulating control in which the control valve is controlled so as to increase the flow rate of the exhaust gas which passes through the oxidation catalyst and the SCR catalyst is performed in a case where the oxidation catalyst is in a temperature state higher than the low temperature state and the SCR catalyst is in a low temperature state at the time of performing the deceleration fuel cut.

8 Claims, 9 Drawing Sheets

(51) Int. Cl.
  *B01D 53/94* (2006.01)
  *F02B 37/04* (2006.01)
  *F01N 9/00* (2006.01)
  *F01N 3/20* (2006.01)
  *F02M 26/05* (2016.01)
  *F02B 39/10* (2006.01)
  *F02B 37/18* (2006.01)

(52) U.S. Cl.
  CPC ............... *B01D 2251/2067* (2013.01); *B01D 2258/012* (2013.01); *F01N 2240/36* (2013.01); *F01N 2560/026* (2013.01); *F01N 2560/06* (2013.01); *F01N 2560/14* (2013.01); *F01N 2570/14* (2013.01); *F01N 2610/02* (2013.01); *F01N 2610/1453* (2013.01); *F01N 2900/08* (2013.01); *F01N 2900/1411* (2013.01); *F01N 2900/1602* (2013.01); *F02B 37/18* (2013.01)

(56) References Cited

FOREIGN PATENT DOCUMENTS

| | | |
|---|---|---|
| JP | 2009197728 A | 9/2009 |
| JP | 2013234608 A | 11/2013 |
| JP | 2014156786 A | 8/2014 |

EXHAUST PURIFICATION DEVICE OF ENGINE, VEHICLE ENGINE INCLUDING EXHAUST PURIFICATION DEVICE, AND METHOD OF CONTROLLING ENGINE

TECHNICAL FIELD

The present invention relates to a technique for purifying an exhaust gas of an engine, and more particularly to a technique applicable to an engine including an oxidation catalyst for purifying HC and CO in the exhaust gas and an NOx selective reducing catalyst for purifying NOx (hereinafter referred to as SCR catalyst).

BACKGROUND ART

As an example of an exhaust purification device of an engine, there has been known an exhaust purification device disclosed in JP2009-197728A. Specifically, the exhaust purification device disclosed in JP2009-197728A includes: in order from an upstream of an exhaust passage, an oxidation catalyst which purifies HC or the like in an exhaust gas; a particulate filter which collects particulate matter in the exhaust gas; a urea water supply valve which injects urea water into the exhaust passage; and an SCR catalyst which purifies NOx in the exhaust gas due to a reduction action of ammonium formed from urea.

In an engine which includes the above-mentioned exhaust purification device, when deceleration fuel cut for stopping supply of fuel at the time of deceleration is performed, air of relatively low temperature which does not contain a burnt gas flows from an intake passage to an exhaust passage. As a result, a temperature of an oxidation catalyst or an SCR catalyst is gradually lowered. However, when the above-mentioned deceleration fuel cut is performed (a large amount of air passing through the oxidation catalyst or the SCR catalyst due to such deceleration fuel cut) under a condition where the temperature of the oxidation catalyst or the SCR catalyst is relatively low, as in the case of a non-warm-up period which comes immediately after starting an engine, the temperature of the oxidation catalyst or the SCR catalyst is further lowered thus giving rise to a drawback that purifying performance of each catalyst is lowered.

SUMMARY OF INVENTION

The present invention has been made in view of the above-mentioned circumstances, and it is an object of the present invention to provide a technique for suppressing lowering of temperatures of an oxidation catalyst and an SCR catalyst at the time of performing deceleration fuel cut in an engine including the oxidation catalyst and the SCR catalyst.

According to an aspect of the present invention, there is provided an exhaust purification device of an engine including: an exhaust passage through which an exhaust gas discharged from an engine body flows; an oxidation catalyst which is disposed in the exhaust passage and purifies HC and CO contained in the exhaust gas; a urea injector which is disposed in the exhaust passage downstream of the oxidation catalyst and supplies urea into the exhaust passage; an SCR catalyst which is disposed in the exhaust passage downstream of the urea injector and purifies NOx in the exhaust gas by a reduction action of ammonium produced from the urea; a control valve capable of regulating a flow rate of the exhaust gas which flows through the exhaust passage; and a controller which controls the urea injector and the control valve. The controller is configured to perform a first flow regulating control in which the control valve is controlled so as to decrease the flow rate of the exhaust gas which passes through the oxidation catalyst and the SCR catalyst in a case where a first temperature condition that the oxidation catalyst is in a low temperature state at the time of performing deceleration fuel cut for stopping supply of fuel into the engine body during deceleration is established, and the controller is configured to perform a second flow regulating control in which the control valve is controlled so as to increase the flow rate of the exhaust gas which passes through the oxidation catalyst and the SCR catalyst compared to the first flow regulating control in a case where a second temperature condition that the oxidation catalyst is in a temperature state higher than the low temperature state and the SCR catalyst is in a low temperature state at the time of performing the deceleration fuel cut is established.

According to another aspect of the present invention, there is provided a vehicle engine capable of purifying an exhaust gas and mounted on a vehicle, the vehicle engine including: an engine body; a fuel injection valve which supplies fuel into the engine body; an intake passage through which air introduced into the engine body flows; an exhaust passage through which an exhaust gas discharged from the engine body flows; an EGR passage which makes the intake passage and the exhaust passage communicate with each other; a throttle valve disposed openably and closably in the intake passage; an EGR valve disposed openably and closably in the EGR passage; an oxidation catalyst which is disposed in the exhaust passage and purifies HC and CO contained in the exhaust gas; a urea injector which is disposed in the exhaust passage downstream of the oxidation catalyst and supplies urea into the exhaust passage; an SCR catalyst which is disposed in the exhaust passage downstream of the urea injector and purifies NOx in the exhaust gas by a reduction action of ammonium produced from the urea; and a controller which controls the fuel injection valve, the throttle valve, the EGR valve, and the urea injector. The controller is configured to perform deceleration fuel cut for stopping supply of the fuel by the fuel injection valve during deceleration in which an opening degree of an accelerator pedal of a vehicle is set to zero, the controller is configured to perform a first flow regulating control in which an opening degree of the throttle valve is lowered compared to the opening degree of the throttle valve immediately before starting of the deceleration fuel cut in a case where a first temperature condition that the oxidation catalyst is in a low temperature state at the time of performing the deceleration fuel cut is established, and the controller is configured to perform a second flow regulating control in which an opening degree of the EGR valve is lowered compared to the opening degree of the EGR valve immediately before starting of the deceleration fuel cut in a case where a second temperature condition that the oxidation catalyst is in a temperature state higher than the low temperature state and the SCR catalyst is in a low temperature state at the time of performing the deceleration fuel cut is established.

According to still another aspect of the present invention, there is provided a method for controlling an engine which includes: an engine body; a fuel injection valve which supplies fuel into the engine body; an exhaust passage through which an exhaust gas discharged from the engine body flows; an oxidation catalyst which is disposed in the exhaust passage and purifies HC and CO contained in the exhaust gas; a urea injector which is disposed in the exhaust passage downstream of the oxidation catalyst and supplies urea into the exhaust passage; an SCR catalyst which is disposed in the exhaust passage downstream of the urea injector and purifies NOx in the exhaust gas by a reduction action of ammonium produced from the urea; and a control valve capable of regulating a flow rate of the exhaust gas which flows through the exhaust passage. The method includes the steps of: performing deceleration fuel cut for stopping supply of the fuel by the fuel injection valve during deceleration; controlling the control valve so as to decrease a flow rate of the exhaust gas which passes through the oxidation catalyst and the SCR catalyst in a case where a first temperature condition that the oxidation catalyst is in a low temperature state at the time of performing the deceleration fuel cut is established; and controlling the control valve so as to increase the flow rate of the exhaust gas which passes through the oxidation catalyst and the SCR catalyst, compared to the case where the first temperature condition is established, in a case where a second temperature condition that the oxidation catalyst is in a temperature state higher than the low temperature state and the SCR catalyst is in a low temperature state at the time of performing the deceleration fuel cut is established.

According to the above-mentioned aspects of the present invention, lowering of a temperature of the oxidation catalyst and a temperature of the SCR catalyst during deceleration fuel cut can be effectively suppressed.

DESCRIPTION OF EMBODIMENTS (1) Overall Configuration of Engine

Figure 1:
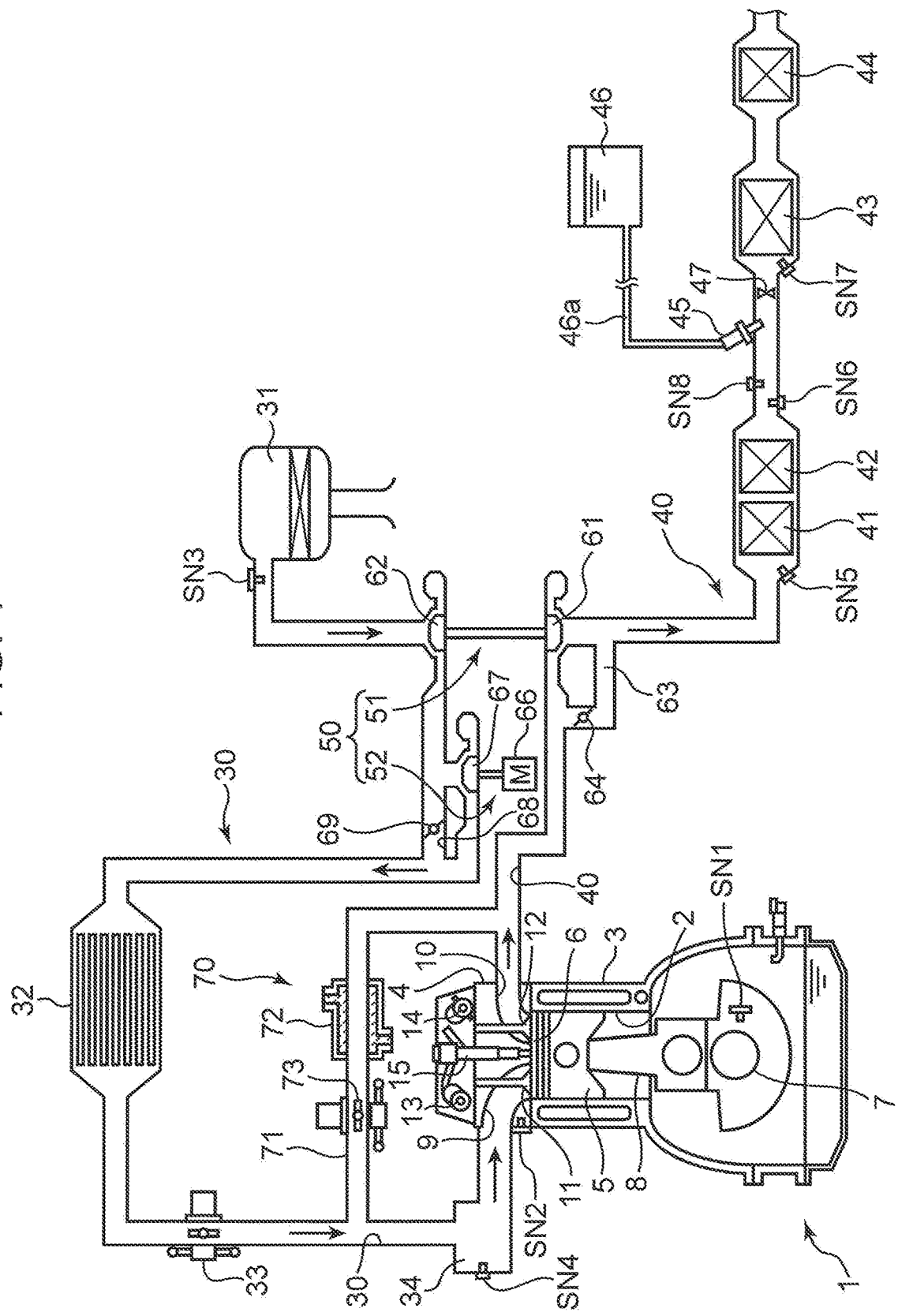
FIG. 1 is a system diagram showing an overall configuration of an engine according to an embodiment of the present invention.

FIG. 1 is a system diagram showing an overall configuration of an engine according to an embodiment of the present invention. The engine shown in FIG. 1 is a 4-cycle diesel engine mounted on a vehicle as a power source for traveling. The engine includes: an engine body 1; an intake passage 30 through which intake air introduced into the engine body 1 flows; an exhaust passage 40 through which an exhaust gas discharged from the engine body 1 flows; a supercharging device 50 which feeds intake air flowing through the intake passage 30 into the engine body 1 while compressing the intake air; and an EGR device 70 which returns a portion of an exhaust gas flowing through the exhaust passage 40 into the intake passage 30.

The engine body 1 includes: a cylinder block 3 in which a cylinder 2 is formed; a cylinder head 4 which is mounted on an upper surface of the cylinder block 3 so as to close the cylinder 2 from above; and a piston 5 which is inserted into the cylinder 2 in a reciprocating manner. The engine body 1 is typically of a multiple-cylinder type having a plurality of cylinders (four cylinders arranged in a row, for example). However, for the sake of simplicity, the description of the engine body 1 is made hereinafter by focusing only on one cylinder 2.

A combustion chamber 6 is defined above the piston 5. Fuel containing light oil as a main component is supplied to the combustion chamber 6 by injection of fuel from a fuel injection valve 15 described later. The supplied fuel is burnt (diffused combustion) by compression ignition, and the piston 5 pushed down by an expansion force generated by the combustion is moved in a reciprocating manner in a vertical direction.

A crankshaft 7 which is an output shaft of the engine body 1 is disposed below the piston 5. The crankshaft 7 is connected to the piston 5 by way of a connecting rod 8, and the crankshaft 7 is rotatably driven about a center axis in response to a reciprocating movement (vertical movement) of the piston 5.

A crank angle sensor SN1 is mounted on the cylinder block 3 for detecting an angle of the crankshaft 7 (crank angle) and a rotational speed of the crankshaft 7 (engine rotational speed). A water temperature sensor SN2 is mounted on the cylinder head 4 for detecting a temperature of cooling water which flows through the inside of the engine body 1 (the cylinder block 3 and the cylinder head 4).

On the cylinder head 4, an intake port 9 and an exhaust port 10, an intake valve 11, an exhaust valve 12, and valve operating mechanisms 13, 14 are mounted. The intake port 9 and the exhaust port 10 open in the combustion chamber 6. The intake valve 11 opens and closes the intake port 9. The exhaust valve 12 opens and closes the exhaust port 10. The valve operating mechanisms 13, 14 drive the intake valve 11 and the exhaust valve 12 in an openable and closable manner interlocking with the rotation of the crankshaft 7.

The fuel injection valve 15 for injecting fuel (light oil) into the combustion chamber 6 is also mounted on the cylinder head 4. The fuel injection valve 15 is, for example, a multiple-injection-aperture type injection valve which injects fuel radially from a center portion of a ceiling surface of the combustion chamber 6. Although not illustrated, a recessed portion (cavity) for receiving fuel injected from the fuel injection valve 15 is formed on a crowned surface of the piston 5.

The intake passage 30 is connected to one side surface of the cylinder head 4 so as to be communicated with the intake port 9. On this intake passage 30, an air cleaner 31 which removes foreign substances in intake air, an inter cooler 32 which cools intake air compressed by the supercharging device 50, a throttle valve 33 (control valve) which is openable and closable for adjusting a flow rate of intake air, and a surge tank 34 are mounted in this order from an upstream of the intake passage 30 (a side remote from the engine body 1).

On a portion of the intake passage 30 downstream of the air cleaner 31, an air flow sensor SN3 which detects a flow rate of air (fresh air) introduced into the engine body 1 through the intake passage 30 is mounted. An intake pressure sensor SN4 which detects a pressure of intake air in the surge tank 34 is mounted on the surge tank 34.

The exhaust passage 40 is connected to the other side surface of the cylinder head 4 so as to be communicated with the exhaust port 10. A plurality of catalysts 41 to 44 are disposed in the exhaust passage 40 for purifying various harmful components contained in the exhaust gas. Specifically, in this embodiment, an oxidation catalyst 41, a diesel particulate filter (DPF) 42, an SCR catalyst 43, and a slip catalyst 44 are disposed in the exhaust passage 40 in this order from an upstream of the exhaust passage 40 (a side close to the engine body 1). A urea injector 45 and a mixing plate 47 are mounted on a portion of the exhaust passage 40 between the DPF 42 and the SCR catalyst 43.

The oxidation catalyst 41 is a catalyst for oxidizing CO and HC in an exhaust gas into non-harmful substances (converting CO and HC into $CO_2$ and $H_2O$). The oxidation catalyst 41 includes, for example, a porous carrier and a catalytic substance such as platinum, or palladium carried on the carrier.

The DPF 42 is a filter for collecting soot in an exhaust gas. A catalytic substance such as platinum is contained in the DPF 42 for burning the soot under a high temperature condition at the time of regenerating the filter.

The urea injector 45 is an injection valve which injects urea water, in which urea of high purity is dissolved, into the exhaust passage 40. Urea water is supplied to the urea injector 45 from a tank 46 storing urea water through a supply pipe 46a. When urea water is injected from the urea injector 45 into the exhaust passage 40, urea contained in the urea water is converted into ammonium ($NH_3$) by hydrolysis under a high temperature, and ammonium is adsorbed by the SCR catalyst 43 disposed downstream of the urea injector 45.

The mixing plate 47 is a plate-like member which partitions the exhaust passage 40 in a longitudinal direction, and is disposed in a portion of the exhaust passage 40 between the urea injector 45 and the SCR catalyst 43. A plurality of apertures are formed in the mixing plate 47 for stirring the flow of an exhaust gas. Such a mixing plate 47 has a function of feeding urea contained in urea water injected from the urea injector 45 toward a downstream side (SCR catalyst 43) while uniformly dispersing urea.

The SCR catalyst 43 is a catalyst for reducing NOx in an exhaust gas into non-harmful substances (converting NOx into $N_2$ and $H_2O$). The SCR catalyst 43 includes, for example, a porous carrier and a catalytic substance such as vanadium, tungsten, or zeolite carried on the carrier. As described previously, ammonium produced from urea water, which is injected from the urea injector 45, is adsorbed by the SCR catalyst 43. The SCR catalyst 43 converts NOx in the exhaust gas into $N_2$ and $H_2O$ due to a chemical reaction in which the ammonium is used as a reducing agent.

The slip catalyst 44 is an oxidation catalyst for oxidizing ammonium slipped from the SCR catalyst 43 (that is, flown out toward a downstream side without being used for reduction of NOx). As such a slip catalyst 44, for example, a catalyst having substantially the same structure as the oxidation catalyst 41 can be used.

A plurality of exhaust temperature sensors SN5 to SN7 are mounted on the exhaust passage 40 for detecting a temperature of an exhaust gas which flows through the inside of the exhaust passage 40. Specifically, on the exhaust passage 40, the first exhaust temperature sensor SN5 which detects a temperature of an exhaust gas flowing immediately upstream of the oxidation catalyst 41, the second exhaust temperature sensor SN6 which detects the temperature of the exhaust gas flowing between the DPF 42 and the urea injector 45, and the third exhaust temperature sensor SN7 which detects the temperature of the exhaust gas flowing between the urea injector 45 and the SCR catalyst 43 (immediately upstream of the SCR catalyst 43) are disposed in this order from an upstream side.

An NOx concentration sensor SN8 which detects concentration of NOx contained in an exhaust gas is disposed on a portion of the exhaust passage 40 between the DPF 42 and the urea injector 45.

The supercharging device 50 is a so-called two-stage type supercharging device, and includes a first supercharger 51 and a second supercharger 52 arranged in series.

The first supercharger 51 is a so-called turbosupercharger, and includes a turbine 61 which is rotatably driven by an exhaust gas which flows through the exhaust passage 40, and a first compressor 62 which is disposed rotatably in an interlocking manner with the turbine 61 and compresses intake air which flows through the intake passage 30. The first compressor 62 is disposed in a portion of the intake passage 30 between the air cleaner 31 and the inter cooler 32. The turbine 61 is disposed in a portion of the exhaust passage 40 upstream of the oxidation catalyst 41. A bypass passage 63 for bypassing the turbine 61 is provided to the exhaust passage 40, and an openable and closable waste gate valve 64 is disposed in the bypass passage 63.

The second supercharger 52 is a so-called electrically-operated supercharger, and includes an electrically-operated drive motor 66, and a second compressor 67 which compresses intake air by being rotatably driven by the drive motor 66. The second compressor 67 is disposed in a portion of the intake passage 30 downstream of the first compressor 62 (between the first compressor 62 and the inter cooler 32). A bypass passage 68 for bypassing the second compressor 67 is provided to the intake passage 30, and an openable and closable bypass valve 69 is disposed in the bypass passage 68.

The EGR device 70 includes: an EGR passage 71 which connects the exhaust passage 40 and the intake passage 30 to each other; and an EGR cooler 72 and an EGR valve 73 mounted on the EGR passage 71. The EGR passage 71 connects a portion of the exhaust passage 40 upstream of the turbine 61, and a portion of the intake passage 30 between the throttle valve 33 and the surge tank 34 to each other. The EGR cooler 72 is, for example, a heat exchanger which utilizes cooling water for the engine, and cools an exhaust gas (EGR gas) returned from the exhaust passage 40 to the intake passage 30 through the EGR passage 71. The EGR valve 73 is disposed in a portion of the EGR passage 71 downstream of the EGR cooler 72 (on a side close to the intake passage 30), and regulates a flow rate of an exhaust gas which flows through the EGR passage 71.

(2) Control System

Figure 2:
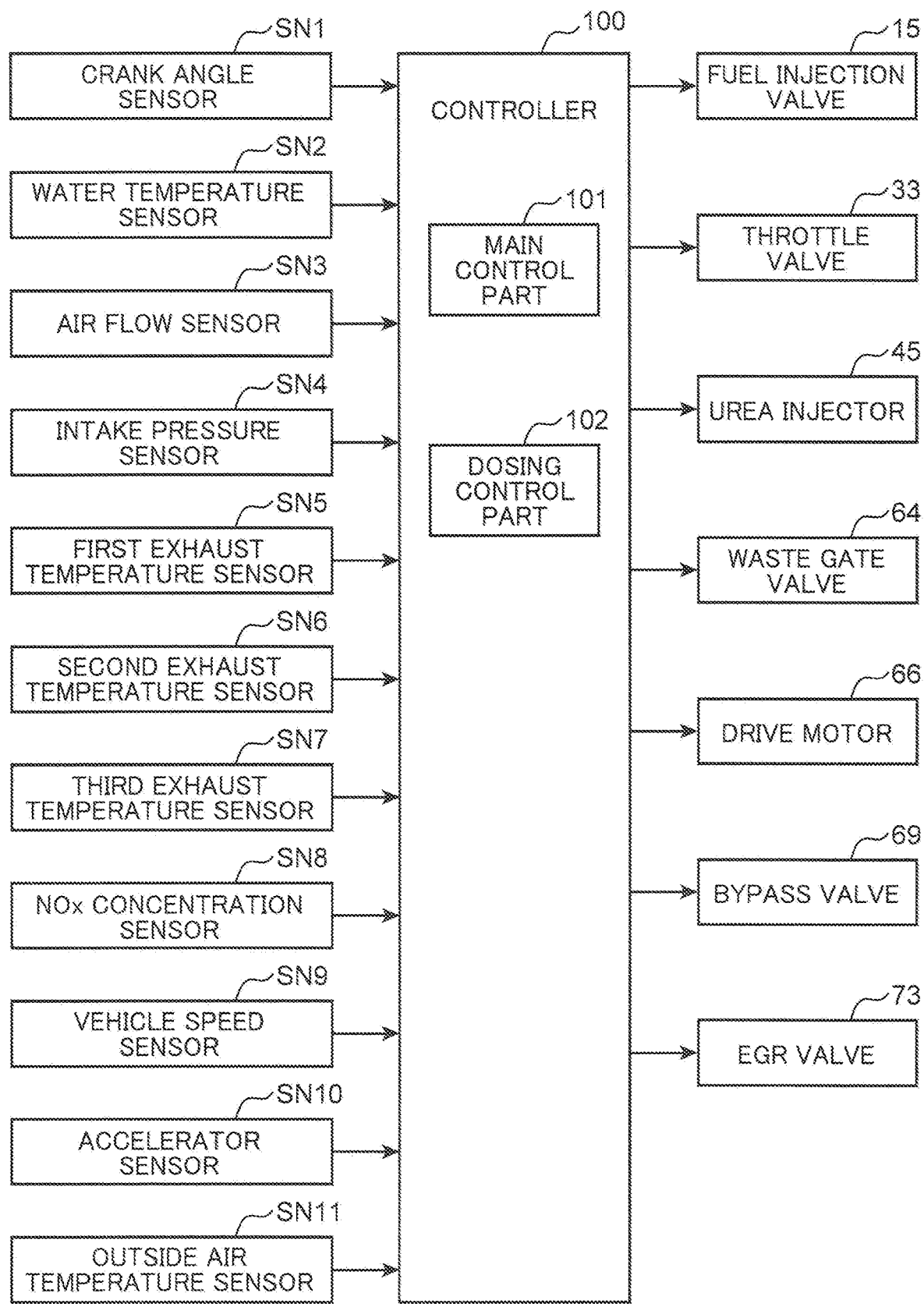
FIG. 2 is a block diagram showing a control system of the engine.

FIG. 2 is a block diagram showing a control system of the engine according to this embodiment. A controller 100 shown in FIG. 2 is a microprocessor for controlling the engine in a comprehensive manner, and is formed of well-known CPU, ROM, RAM and the like. It is not always necessary that the controller 100 be formed of a single processor, and may include a plurality of processors electrically connected to each other (in an interconnecting manner). For example, the controller 100 may include a first processor for mainly controlling the engine body 1, and a second processor for controlling the urea injector 45 and the like.

Detection information obtained by various sensors is inputted to the controller 100. Specifically, the controller 100 is electrically connected to the crank angle sensor SN1, water temperature sensor SN2, air flow sensor SN3, intake pressure sensor SN4, first to third exhaust temperature sensors SN5 to SN7, and NOx concentration sensor SN8. Various information detected by these sensors, for example, a crank angle, an engine rotational speed, an engine water temperature, an intake air flow rate, an intake pressure (supercharge pressure), a temperature of an exhaust gas and NOx concentration in an exhaust gas are inputted to the controller 100 respectively.

The vehicle also includes: a vehicle speed sensor SN9 which detects a traveling speed of the vehicle (hereinafter referred to as vehicle speed); an accelerator sensor SN10 which detects an opening degree of an accelerator pedal manipulated by a driver who drives the vehicle (hereinafter referred to as accelerator opening degree), and an outside air temperature sensor SN11 which detects an outside air temperature. Detection information detected by the vehicle speed sensor SN9, the accelerator sensor SN10 and the outside air temperature sensor SN11 is also inputted to the controller 100.

The controller 100 controls the respective parts of the engine while performing various determinations, arithmetic operations and the like based on input information from the respective sensors SN1 to SN11. The controller 100 is electrically connected to the fuel injection valve 15, the throttle valve 33, the urea injector 45, the waste gate valve 64, the drive motor 66, the bypass valve 69, the EGR valve 73 and the like. The controller 100 outputs control signals to these devices based on results of the above-mentioned arithmetic operations and the like.

The controller 100 includes a main control part 101 and a dosing control part 102 as functional elements relating to the above-mentioned control.

Figure 6:
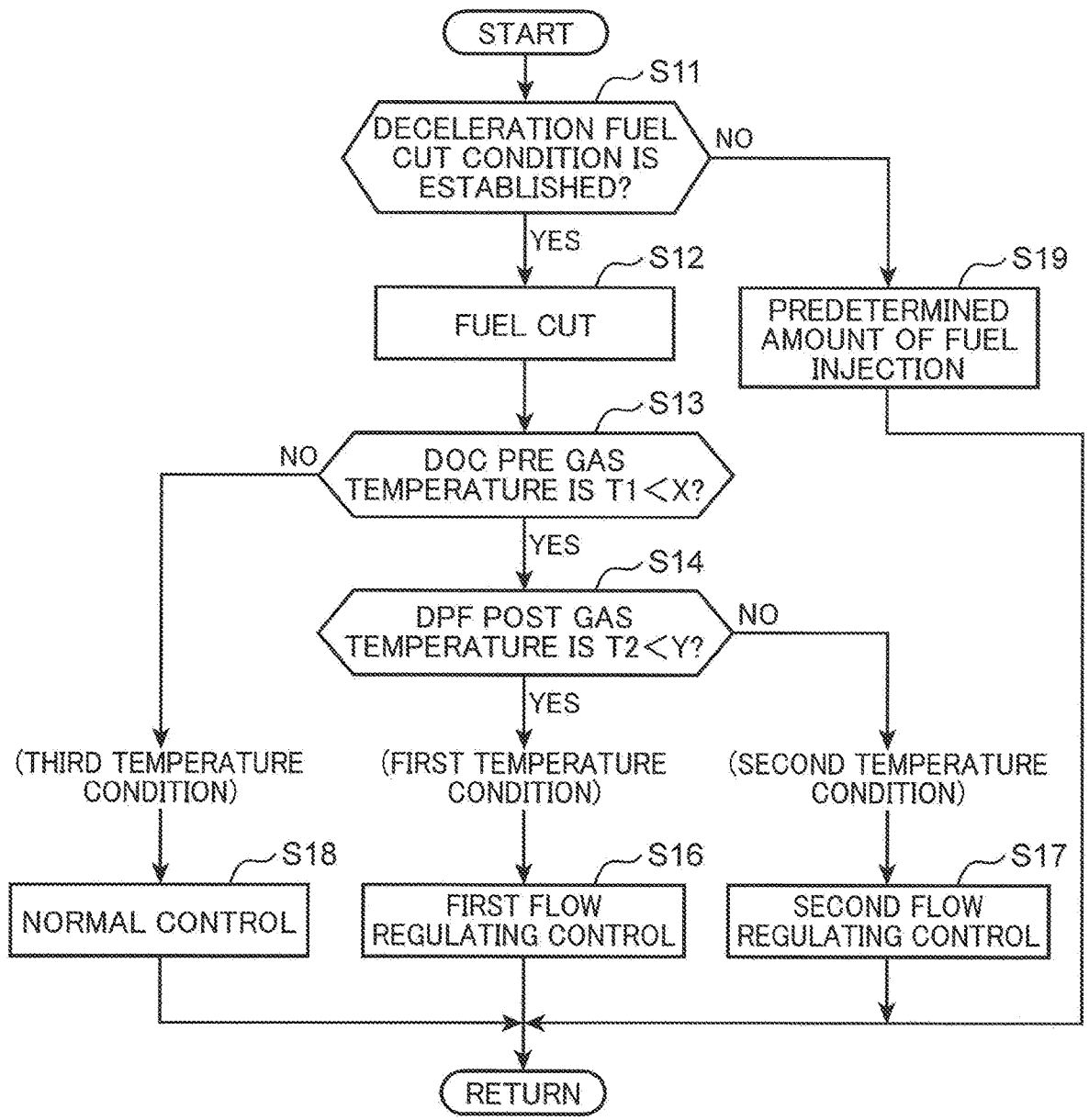
FIG. 6 is a flowchart showing specific steps of a control performed during deceleration fuel cut of an engine.

The main control part 101 is a control module which mainly performs a combustion control in the engine body 1. For example, the main control part 101 determines an injection amount and an injection timing of fuel injected from the fuel injection valve 15 based on: an engine rotational speed detected by the crank angle sensor SN1; an engine load (required torque) specified based on a detection value (accelerator opening degree) of the accelerator sensor SN10; and an intake flow rate detected by the air flow sensor SN3, and controls the fuel injection valve 15 in accordance with the determination. The main control part 101 sets a target supercharge pressure based on the above-mentioned engine rotational speed, load and the like and, at the same time, controls respective opening degrees of the waste gate valve 64 and the bypass valve 69 and the rotation of the drive motor 66 such that an intake pressure (supercharge pressure) detected by the intake pressure sensor SN4 coincides with the target supercharge pressure. Further, the main control part 101 sets a target EGR rate which is a target value of an EGR rate (a rate of an EGR gas with respect to a total gas introduced into the cylinder 2) based on the above-mentioned engine rotational speed, load and the like, and controls the respective opening degrees of the throttle valve 33 and the EGR valve 73 such that the target EGR rate is realized. The main control part 101 performs a control of regulating a flow rate of an exhaust gas based on temperature states of the oxidation catalyst 41 and the SCR catalyst 43 at the time of deceleration fuel cut described later (FIG. 6).

The dosing control part 102 is a control module which controls injection of urea water by the urea injector 45. For example, the dosing control part 102 determines an injection amount of urea water based on a temperature of an exhaust gas detected by the third exhaust temperature sensor SN7 (an exhaust gas temperature immediately before the SCR catalyst 43), and controls the urea injector 45 in accordance with the determination.

(3) Dosing Control

Next, the description is made with respect to a dosing control for making the SCR catalyst 43 adsorb ammonium. In this dosing control, a control is performed such that a target adsorption amount of ammonium (Qa in FIG. 4) is set based on a temperature of the SCR catalyst 43, and an amount of urea water corresponding to a target adsorption amount of ammonium is injected from the urea injector 45. Hereinafter, this operation is described in detail.

Figure 3:
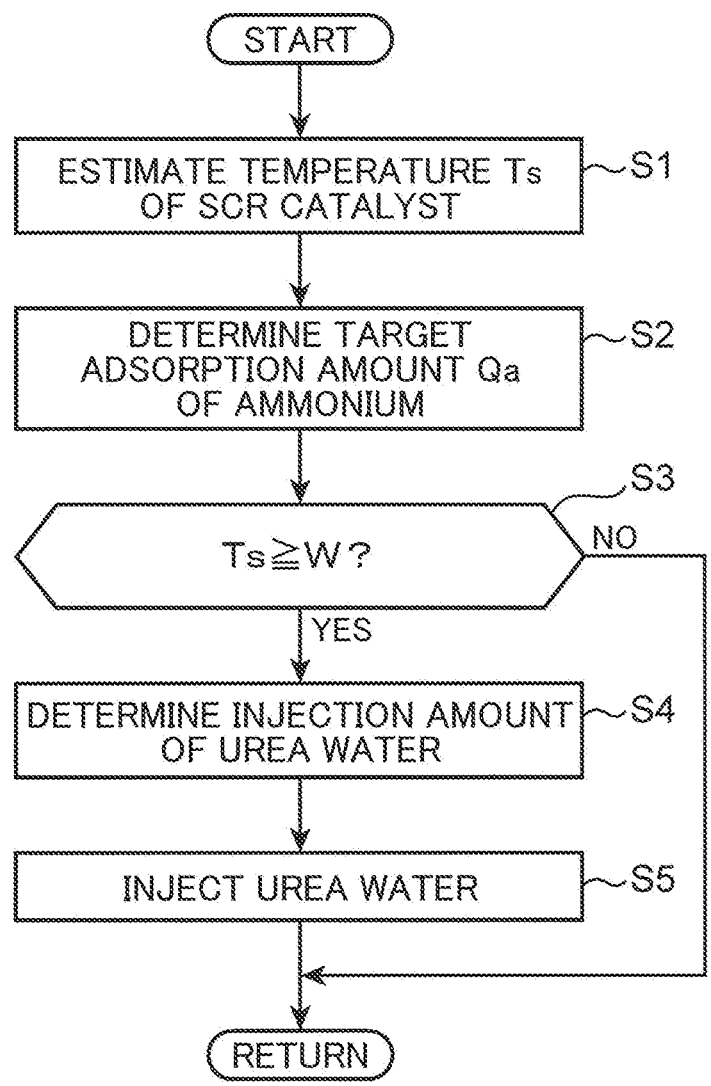
FIG. 3 is a flowchart showing specific steps of a dosing control performed for supplying urea to an SCR catalyst.

FIG. 3 is a flowchart showing specific steps of a dosing control during normal operation of the engine. When a control shown in the flowchart starts, the controller 100 estimates a temperature Ts of the SCR catalyst 43 in step S1. The temperature Ts of the SCR catalyst 43 is typically a temperature of a carrier of the SCR catalyst 43, that is, a floor temperature of the SCR catalyst 43.

Specifically, in step S1, the temperature Ts of the SCR catalyst 43 is calculated (estimated) based on heat input amounts and heat discharge amounts at respective points of time with respect to the SCR catalyst 43, and a prestored heat capacity of the SCR catalyst 43. The heat input amount to the SCR catalyst 43 can be calculated based on a temperature of an exhaust gas immediately in front of the SCR catalyst 43 detected by the third exhaust temperature sensor SN7 and a flow rate of an exhaust gas estimated from a detection value of the air flow sensor SN3 (intake air amount), an opening degree of the EGR valve 73 and the like. A heat discharge amount from the SCR catalyst 43 can be calculated based on a vehicle speed detected by the vehicle speed sensor SN9 and an outside air temperature detected by the outside air temperature sensor SN11. The temperature Ts of the SCR catalyst 43 is calculated such that the larger the heat input amount or the smaller the head discharge amount is, the higher the value of the temperature Ts becomes, while the smaller the heat input amount or the larger the heat discharge amount is, the lower the value of the temperature Ts becomes.

Next, the controller 100 advances to step S2, and determines a target adsorption amount Qa of ammonium to be adsorbed by the SCR catalyst 43. As shown in a graph shown in FIG. 4, the target adsorption amount Qa is variably set in response to a temperature of the SCR catalyst 43 (SCR temperature) Ts. The controller 100 preliminarily stores a map where a relationship between the temperature Ts of the SCR catalyst 43 and the target adsorption amount Qa is established, and determines the target adsorption amount Qa by collating the temperature Ts of the SCR catalyst 43 estimated in step S1 with the map.

Figure 4:
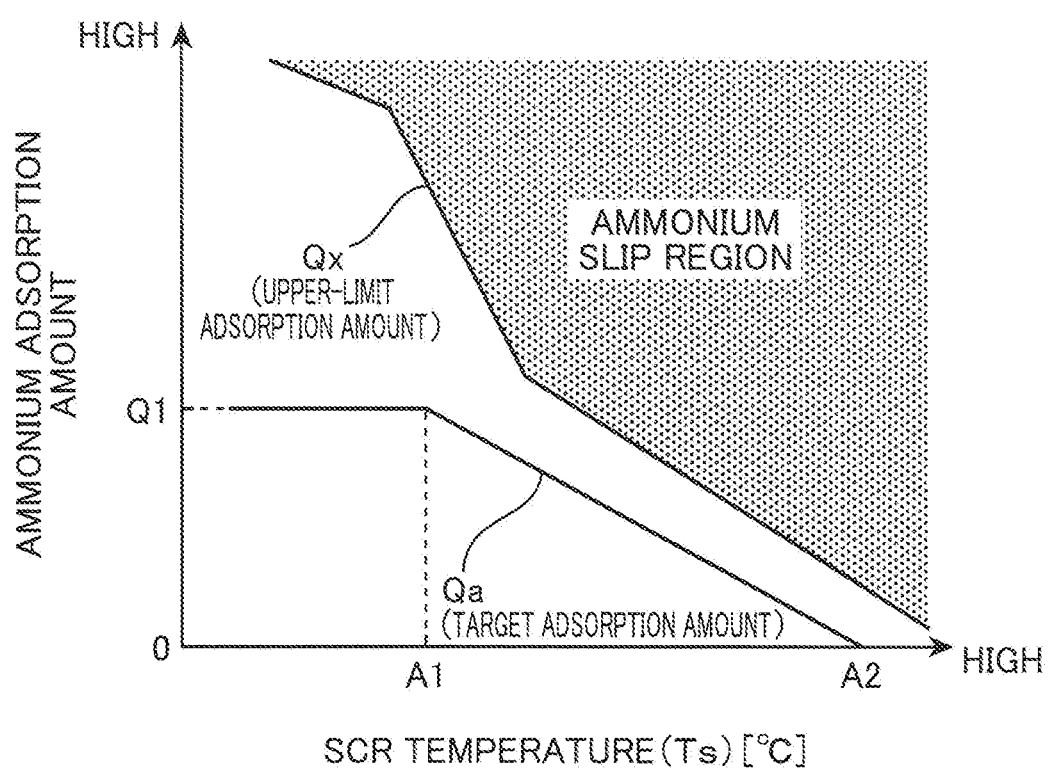
FIG. 4 is a graph showing a relationship between a temperature of an SCR catalyst and an upper-limit adsorption amount and a target adsorption amount of ammonium.

A target adsorption amount Qa of ammonium is set to a value which is smaller than an upper-limit adsorption amount Qx of ammonium also shown in FIG. 4. The upper-limit adsorption amount Qx is an upper limit ammonium adsorption amount which can be adsorbed by the SCR catalyst 43, and is also referred to as a saturated adsorption amount. The SCR catalyst 43 has a property that the higher a temperature of the SCR catalyst 43 is, the more difficult the adsorption of ammonium by the SCR catalyst 43 becomes. Accordingly, a line of the upper-limit adsorption amount Qx shown in FIG. 4 has a tendency where an adsorption amount is decreased toward a high temperature side (right side) as a whole (a right downward line).

In conformity with the above-mentioned tendency of the upper-limit adsorption amount Qx, the target adsorption amount Qa of ammonium is also set such that the higher a temperature Ts of the SCR catalyst 43 is, the lower the target adsorption amount Qa of ammonium becomes (reversely, the lower the temperature Ts of the SCR catalyst 43 is, the higher the target adsorption amount Qa of ammonium becomes). On the other hand, the target adsorption amount Qa changes depending on a temperature in this manner only within a range from a first predetermined temperature A1 to a second predetermined temperature A2, the target adsorption amount Qa is uniformly set to Q1 within a range on a low temperature side where the temperature Ts is a first predetermined temperature A1 or below and the target adsorption temperature Qa is uniformly set to zero within a range on a high temperature side where the temperature Ts is a second predetermined temperature A2 or above. The reason the target adsorption amount Qa is set to the fixed value Q1 on the low temperature side (Ts≤A1) as in the former case is that when ammonium is adsorbed at a level of Q1, the SCR catalyst 43 exhibits a sufficiently favorable NOx purification performance and hence, there is no meaning in further increasing an adsorption amount exceeding Q1.

Next, the controller 100 advances to step S3, and determines whether or not the temperature Ts of the SCR catalyst 43 estimated in step S1 is a preset injection allowable temperature W or above. The injection allowable temperature W is a threshold value for determining whether or not injection of urea water from the urea injector 45 is allowed, and is preset by taking into account a rate that urea contained in urea water is converted into ammonium. The injection allowable temperature W is set to a value lower than the first predetermined temperature A1 (a temperature at which the target adsorption amount Qa of ammonium takes a maximum value) shown in the map in FIG. 4.

Figure 5:
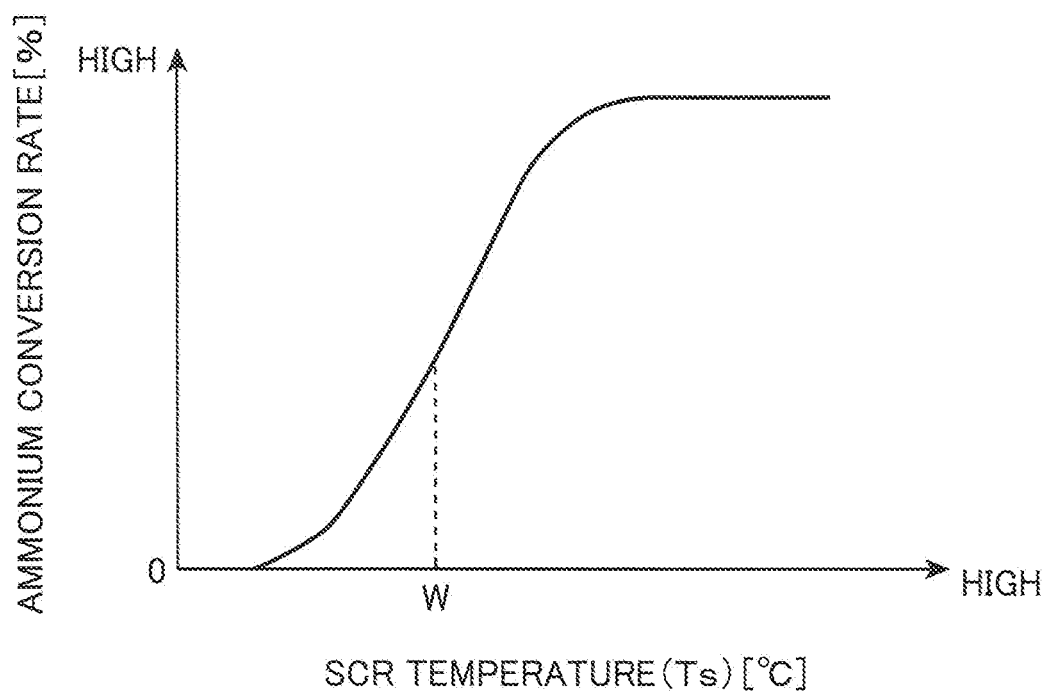
FIG. 5 is a graph showing a relationship between a temperature of an SCR catalyst and an ammonium conversion rate.

FIG. 5 is a graph showing a relationship between a temperature of the SCR catalyst 43 (SCR temperature) Ts and a rate that urea is converted into ammonium (ammonium conversion rate). As shown in the graph in FIG. 5, the higher the temperature Ts of the SCR catalyst 43 is, the higher the ammonium conversion rate becomes, and reversely, the lower the temperature Ts of the SCR catalyst 43 is, the lower the ammonium conversion rate becomes. This means that even when urea water is injected in a state where the temperature Ts of the SCR catalyst 43 is relatively low, a large amount of urea is not adsorbed by the SCR catalyst 43 in the form of ammonium (that is, a large amount of injected urea water is used wastefully). In view of such circumstances, in this embodiment, the injection allowable temperature W is set with respect to the temperature Ts of the SCR catalyst 43, and the injection of urea water is inhibited when the temperature Ts is below the injection allowable temperature W.

Next, the controller 100 advances to steps S4, S5, determines an injection amount of urea water to be injected from the urea injector 45, and urea corresponding to the determined injection amount is injected from the urea injector 45.

Specifically, in step S4, a supply amount of ammonium (desired ammonium supply amount) necessary for maintaining an amount of ammonium adsorbed by the SCR catalyst 43 at a target adsorption amount Qa or an amount around the target adsorption amount Qa is obtained based on the target adsorption amount Qa of ammonium determined in step S2 and ammonium consumption amounts at respective points of time consumed for performing NOx purification by the SCR catalyst 43, and an injection amount of urea water is determined based on the desired ammonium supply amount. The ammonium consumption amount can be calculated (estimated) based on NOx concentration in an exhaust gas detected by the NOx concentration sensor SN8 and a flow rate of the exhaust gas.

(4) Control During Deceleration Fuel Cut

Next, a control performed during deceleration fuel cut of the engine is described with reference to a flowchart shown in FIG. 6. When the control shown in the flowchart in FIG. 6 starts, in step S11, the controller 100 determines whether or not a preset deceleration fuel cut condition is established. For example, the controller 100 determines whether or not a plurality of conditions such as the condition (i) that an accelerator opening degree is zero, the condition (ii) that a vehicle speed is a predetermined value or more, the condition (iii) that an engine rotational speed is a predetermined value or more are established based on respective detection values of the accelerator sensor SN10, the vehicle speed sensor SN9, the crank angle sensor SN1, and the like, and the controller 100 determines that the deceleration fuel cut condition is established when all of the plurality of conditions are established.

In step S11, when the determination is made as "NO" and it is confirmed that the deceleration fuel cut condition is not established, the controller 100 advances to step S19, and executes a control for making the fuel injection valve 15 inject a predetermined amount of fuel set based on an operating condition of the engine or the like.

On the other hand, in step S11, when the determination is made as "YES" and it is confirmed that the deceleration fuel cut condition is established, the controller 100 advances to step S12, and executes a fuel cut which stops fuel injection from the fuel injection valve 15 (setting a fuel injection amount to zero).

Next, the controller 100 advances to step S13, and determines whether or not a temperature of an exhaust gas detected by the first exhaust temperature sensor SN5, that is, a temperature T1 of the exhaust gas which flows immediately upstream of the oxidation catalyst 41 is below the preset first threshold value X. In the flowchart shown in FIG. 6, "DOC" indicates an oxidation catalyst 41, and, hereinafter, an exhaust gas temperature T1 just in front of the oxidation catalyst 41 detected by the first exhaust temperature sensor SN5 is also referred to as "DOC pre gas temperature". The DOC pre gas temperature T1 corresponds to "a temperature of the exhaust gas which flows upstream of the oxidation catalyst" in the claims. During performing of deceleration fuel cut, an exhaust gas which basically contains no burnt gas (that is, air) flows through the exhaust passage 40. In this specification, however, a gas which flows through the exhaust passage 40 is collectively referred to as an exhaust gas, and it does not matter whether or not the exhaust gas contains the burnt gas.

In step S13, when the determination is made as "YES" and it is confirmed that a DOC pre gas temperature T1 (an exhaust gas temperature just in front of the oxidation catalyst 41) is below a first threshold value X, the controller 100 advances to step S14, and determines whether or not the temperature of the exhaust gas detected by the second exhaust temperature sensor SN6, that is, the temperature T2 of the exhaust gas which flows between the DPF 42 and the SCR catalyst 43 (hereinafter, also referred to as DPF post gas temperature) is below a preset second threshold value Y. In this embodiment, the oxidation catalyst 41, the DPF 42, and the SCR catalyst 43 are disposed in this order from an upstream side and hence, the temperature of the exhaust gas (DPF post gas temperature) T2 detected by the second exhaust temperature sensor SN6 may be also referred to as the temperature of the exhaust gas flowing downstream of the oxidation catalyst 41 or the temperature of the exhaust gas flowing between the oxidation catalyst 41 and the SCR catalyst 43. That is, the DPF post gas temperature T2 corresponds to "the temperature of the exhaust gas which flows between the oxidation catalyst and the SCR catalyst" in the claims.

In step S14, when the determination is made as "YES" and it is confirmed that the DPF post gas temperature T2 (the exhaust gas temperature between the oxidation catalyst 41 and the SCR catalyst 43) is below the second threshold value Y, the controller 100 advances to step S16, and executes a first flow regulating control for decreasing a flow rate of the exhaust gas which flows through the exhaust passage 40 compared to a normal control (S18) described later. The second threshold value Y is set to a value lower than the above-mentioned first threshold value X.

The determination "YES" in step S14 means that both two conditions, that is, (i) the DOC pre gas temperature T1 is below the first threshold value X, and (ii) the DPF post gas temperature T2 is below the second threshold value Y are established. In the description made hereinafter, such temperature conditions are referred to as a first temperature condition. The establishment of the first temperature condition indicates that a temperature of the oxidation catalyst 41 is relatively low (the oxidation catalyst 41 is in a low temperature state). That is, both the DOC pre gas temperature T1 which is the temperature of the exhaust gas flowing upstream of the oxidation catalyst 41 and the DPF post gas temperature T2 which is the temperature of the exhaust gas flowing downstream of the oxidation catalyst 41 (between the oxidation catalyst 41 and the SCR catalyst 43) are lower than threshold values and hence, the temperature of the oxidation catalyst 41 is inevitably maintained at a relatively low level. When such a low temperature state of the oxidation catalyst 41 (in other words, a state where the oxidation catalyst 41 is not sufficiently activated) continues, for example, a state is continued where HC whose discharge amount is liable to be increased during cold operation of the engine cannot be sufficiently purified by the oxidation catalyst 41. Such a state is not favorable. Accordingly, in step S16, to suppress further lowering of the temperature of the oxidation catalyst 41, a first flow regulating control is executed for decreasing a flow rate of the exhaust gas.

Figure 7:
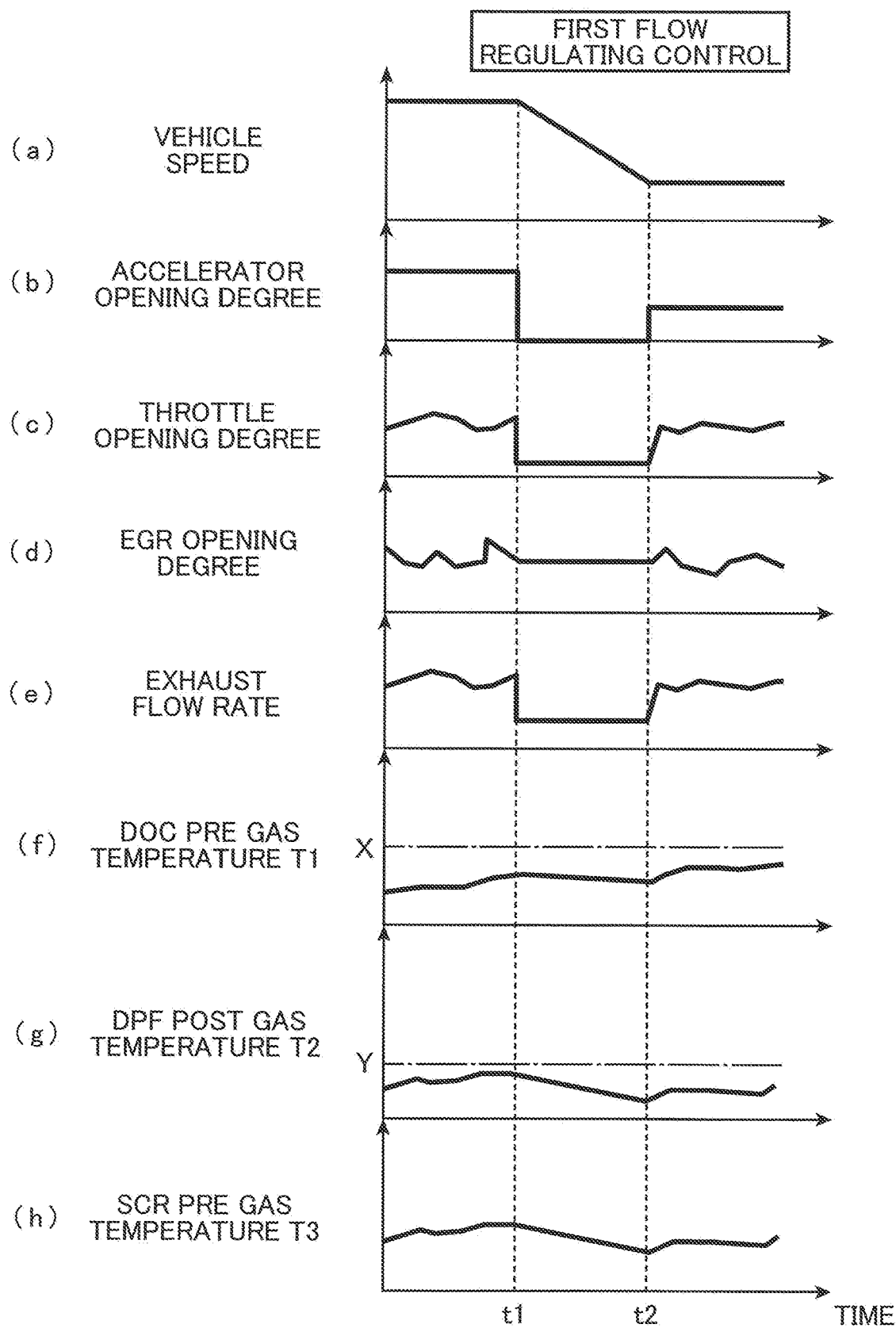
FIG. 7 is a timing chart for describing a specific content of a first flow regulating control performed in step 16 in FIG. 6.

FIG. 7 is a timing chart for describing the content of the first flow regulating control executed in step S16. The graphs (a) to (h) in the timing chart shown in FIG. 7 indicate changes with time of a vehicle speed, an accelerator opening degree, an opening degree of the throttle valve 33 (throttle opening degree), an opening degree of the EGR valve 73 (EGR opening degree), a flow rate of an exhaust gas (exhaust flow rate), a DOC pre gas temperature T1 detected by the first exhaust temperature sensor SN5, a DPF post gas temperature T2 detected by the second exhaust temperature sensor SN6, an exhaust gas temperature (SCR pre gas temperature) T3 just in front of the SCR catalyst 43 detected by the third exhaust temperature sensor SN7. Further, a point of time t1 indicates a point of time when deceleration fuel cut is started, and a point of time t2 indicates a point of time when deceleration fuel cut is finished (the supply of fuel is restored).

As shown in FIG. 7, in the first flow regulating control, during a period from a point of time t1 to a point of time t2 during which deceleration fuel cut is performed, an opening degree of the throttle valve 33 (graph (c)) is decreased compared to the opening degree of the throttle valve 33 immediately before starting fuel cut. On the other hand, the opening degree of the EGR valve 73 during the period from the point of time t1 to the point of time t2 is maintained at the same opening degree as immediately before starting fuel cut. With such a control, a flow rate of an exhaust gas which passes through the oxidation catalyst 41 and the SCR catalyst 43 is decreased compared to a corresponding flow rate of the exhaust gas immediately before starting fuel cut (graph (e)). Such lowering of the flow rate of the exhaust gas brings about an effect of keeping the oxidation catalyst 41 warm although the detail of such an effect is described later.

Next, the description is made with respect to a control when the determination is made as "NO" in step S14, that is, when a DPF post gas temperature T2 is equal to or above a second threshold value Y. In this case, the controller 100 advances to step S17, and executes a second flow regulating control for increasing a flow rate of an exhaust gas which flows through the exhaust passage 40 compared to the first flow regulating control (S16) described previously.

The determination "YES" in step S14 means that although (i) a DOC pre gas temperature T1 is still below a first threshold value X, (ii) a DPF post gas temperature T2 is elevated to a second threshold value Y or above. In the description made hereinafter, such temperature conditions are referred to as a second temperature condition. The establishment of the second temperature condition indicates that although the oxidation catalyst 41 is warmed to some extent (the oxidation catalyst 41 is shifted to an intermediate temperature state), the SCR catalyst 43 is still maintained in a low temperature state. That is, in this case, although a DOC pre gas temperature T1 which is a temperature of an exhaust gas flowing upstream of the oxidation catalyst 41 is still lower than a threshold value, a DPF post gas temperature T2 which is the temperature of the exhaust gas flowing downstream of the oxidation catalyst 41 is higher than a threshold value so that a width of lowering of the temperature of the exhaust gas which is generated in a course that the exhaust gas passes through the oxidation catalyst 41 is reduced. This reduction of the temperature lowering width of the exhaust gas means that the temperature of the oxidation catalyst 41 is relatively increased, that is, the oxidation catalyst 41 is shifted to an intermediate temperature state. On the other hand, in view of a relationship that the SCR catalyst 43 is positioned downstream of the oxidation catalyst 41, it is considered that the SCR catalyst 43 is still in a low temperature state. When the SCR catalyst 43 is continuously maintained in a low temperature state, for example, a state where a temperature of the SCR catalyst 43 is lower than an injection allowable temperature W shown in FIG. 5 (that is, a state where urea water cannot be supplied) is continued. Such a state is not favorable. Accordingly, in step S17, a second flow regulating control for increasing a flow rate of an exhaust gas is executed for assigning priority on keeping the SCR catalyst 43 warm.

Figure 8:
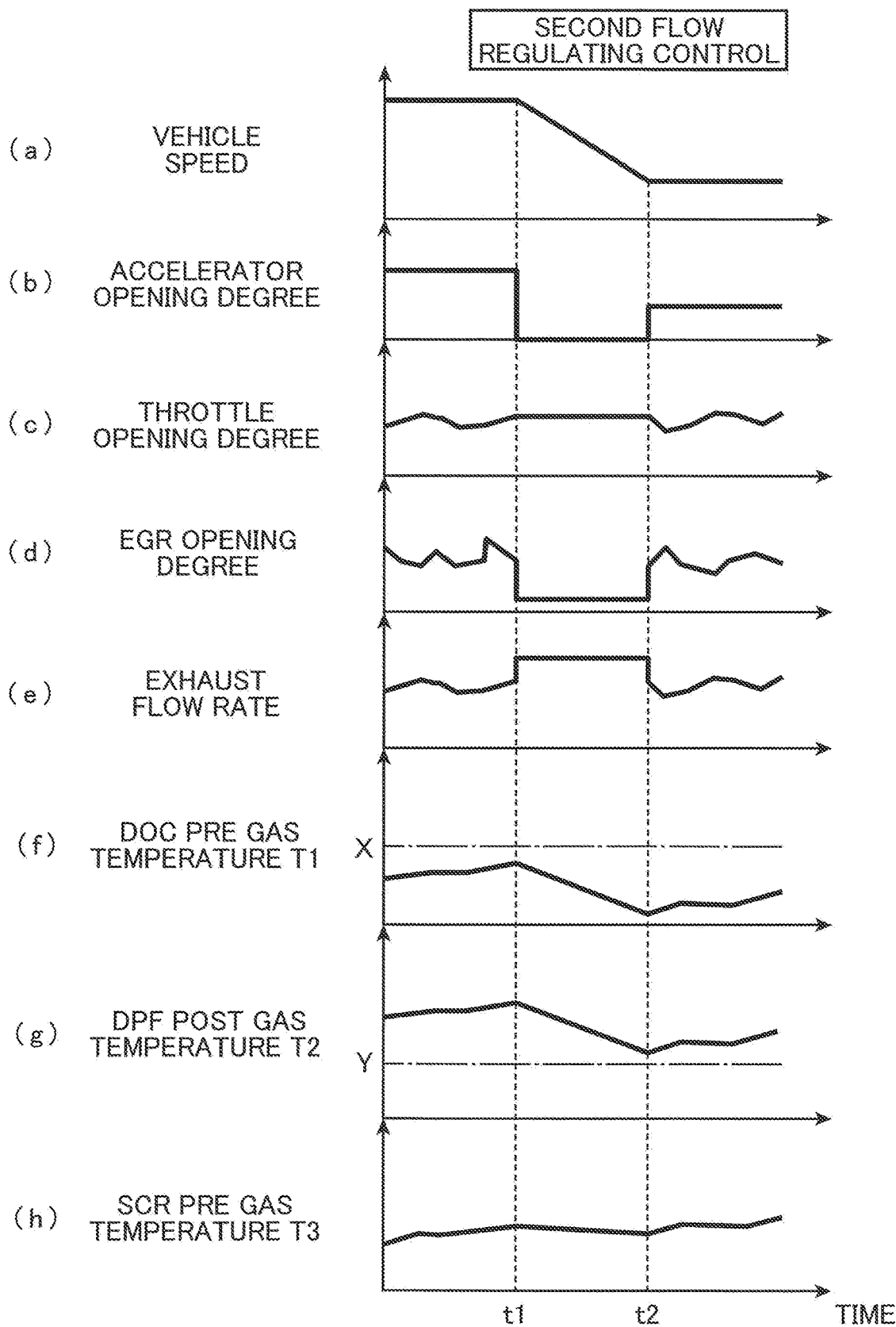
FIG. 8 is a timing chart for describing a specific content of a second flow regulating control performed in step 17 in FIG. 6.

FIG. 8 is a timing chart for describing the content of the second flow regulating control executed in step S17. As shown in FIG. 8, in the second flow regulating control, during a period from a point of time t1 to a point of time t2 during which deceleration fuel cut is performed, an opening degree of the throttle valve 33 (graph (c)) is maintained at the same opening degree as the opening degree of the throttle valve 33 immediately before starting fuel cut. That is, unlike the above-mentioned first flow regulating control (FIG. 7), a throttle control of the throttle valve 33 is not performed. On the other hand, the opening degree of the EGR valve 73 during the period from the point of time t1 to the point of time t2 is decreased compared to the opening degree of the EGR valve 73 immediately before starting fuel cut (that is, a return flow rate of the exhaust gas from the exhaust passage 40 to the intake passage 30 is decreased). With such a control, a flow rate of an exhaust gas which passes through the oxidation catalyst 41 and the SCR catalyst 43 is increased compared to a corresponding flow rate of the exhaust gas immediately before starting fuel cut, and is also increased compared to a corresponding flow rate at the time of performing the first flow regulating control (graph (e)). Although the details will be described later, such an increase of the flow rate of the exhaust gas brings about an effect of keeping the SCR catalyst 43 warm.

Next, the description is made with respect to a control when the determination is made as "NO" in step S13, that is, when a DOC pre gas temperature T1 is equal to or above a first threshold value X. In this case, the controller 100 advances to step S18, and executes a normal control in which a flow rate of an exhaust gas which passes through the exhaust passage 40 is not particularly operated (a flow rate is neither increased nor decreased for keeping the catalyst warm).

Figure 9:
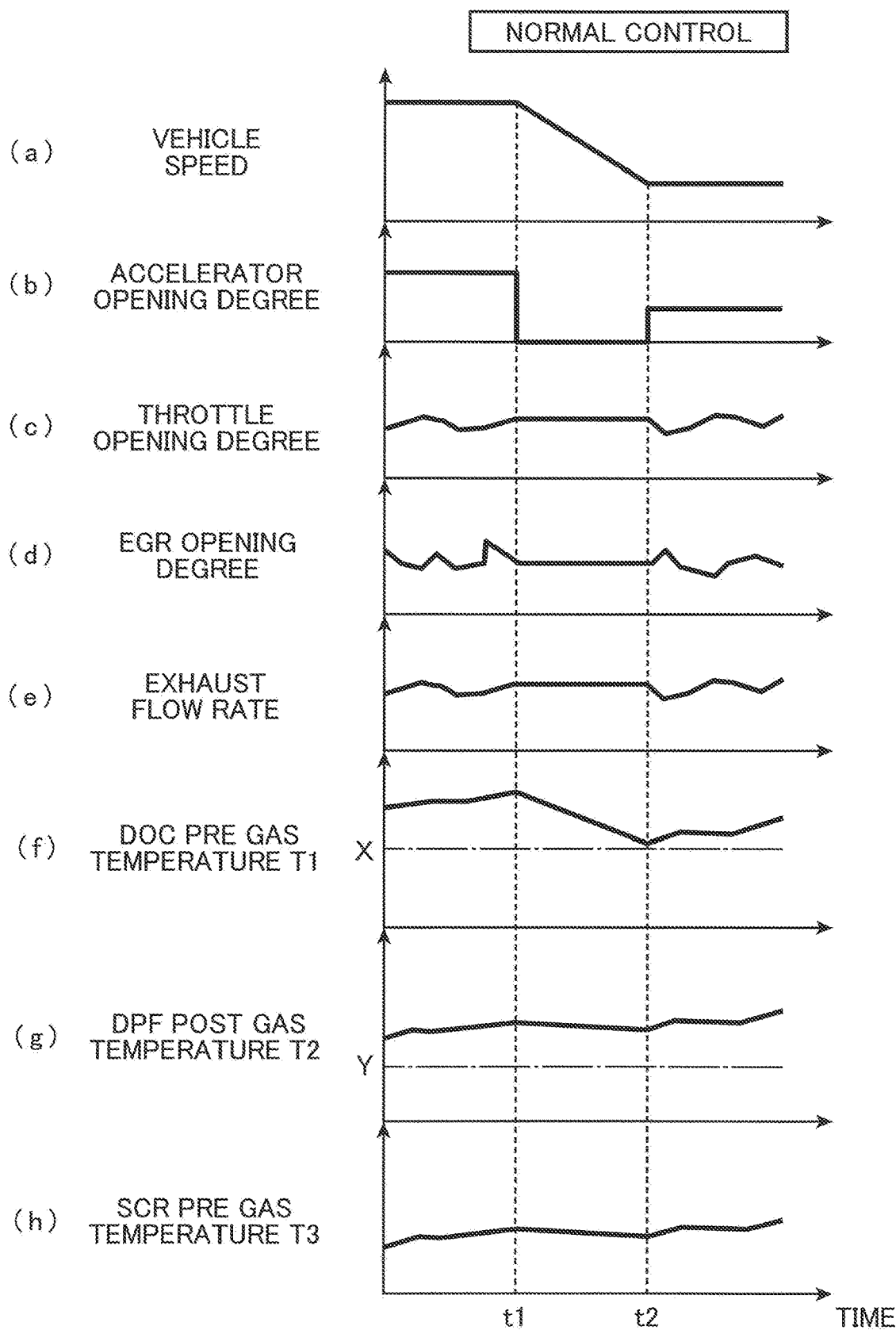
FIG. 9 is a timing chart for describing a specific content of a normal control performed in step 18 in FIG. 6.

That is, the increase of a DOC pre gas temperature T1 to the first threshold value X or above during deceleration fuel cut means that a wall surface temperature of the exhaust passage 40 becomes sufficiently high, and the oxidation catalyst 41 and the SCR catalyst 43 are also sufficiently warmed (brought into a high temperature state) respectively. Hereinafter, such a temperature condition is referred to a third temperature condition. When the third temperature condition is established, it is considered that purification performances of the oxidation catalyst 41 and the SCR catalyst 43 are sufficiently ensured, and there exists no particular request for keeping the oxidation catalyst 41 and the SCR catalyst 43 warm. Accordingly, in step S18, a normal control to be performed during deceleration fuel cut is performed, and no particular operation for increasing or decreasing a flow rate of an exhaust gas for keeping the oxidation catalyst 41 and the SCR catalyst 43 warm is performed. Specifically, as shown in the timing chart in FIG. 9, the controller 100 neither increases nor decreases an opening degree of the throttle valve 33 and an opening degree of the EGR valve 73 during the period from the point of time t1 to the point of time t2 which is a deceleration fuel cut performing period thus maintaining substantially the same opening degrees as the opening degrees at the time of starting fuel cut. Accordingly, a flow rate of an exhaust gas which passes through the oxidation catalyst 41 and the SCR catalyst 43 is increased compared to the first flow regulating control, and is decreased compared to the second flow regulating control.

(5) Operation and Effects

As described above, in this embodiment, in the case where the first temperature condition is established in which a DOC pre gas temperature T1 (an exhaust gas temperature just in front of the oxidation catalyst 41) is below the first threshold value X and the DPF post gas temperature T2 (an exhaust gas temperature between the oxidation catalyst 41 and the SCR catalyst 43) is below the second threshold value Y at the time of performing the deceleration fuel cut, and it is confirmed that the oxidation catalyst 41 is in a low temperature state, a first flow regulating control (S16) for decreasing a flow rate of an exhaust gas which passes through the oxidation catalyst 41 and the SCR catalyst 43 is performed. On the other hand, in the case where the second temperature condition is established in which the DOC pre gas temperature T1 is below the first threshold value X and the DPF post gas temperature T2 is equal to or above the second threshold value Y at the time of performing the deceleration fuel cut, and it is confirmed that the SCR catalyst 43 is still in a low temperature state although the oxidation catalyst 41 is in an intermediate temperature state, a second flow regulating control (S17) for increasing a flow rate of an exhaust gas which passes through the oxidation catalyst 41 and the SCR catalyst 43 compared to the first flow regulating control is performed. With such a configuration, it is possible to acquire an advantageous effect of lowering of a temperature of the oxidation catalyst 41 and a temperature of the SCR catalyst 43 at the time of deceleration fuel cut can be effectively suppressed.

That is, in the above-mentioned embodiment, when the first temperature condition is established at the time of performing the deceleration fuel cut and it is confirmed that the oxidation catalyst 41 is in a low temperature state, a flow rate of an exhaust gas is decreased by the first flow regulating control. Accordingly, it is possible to prevent flowing of a large amount of an exhaust gas of a low temperature into the oxidation catalyst 41 and hence, lowering of a temperature of the oxidation catalyst 41 due to the exhaust gas can be suppressed. Specifically, a burnt gas of high temperature is not contained in an exhaust gas at the time of performing deceleration fuel cut and hence, the temperature of the exhaust gas is lowered naturally. Particularly, under the first temperature condition where the oxidation catalyst 41 is in a low temperature state, a temperature of a wall surface of the exhaust passage 40 is low as a matter of course. Accordingly, assuming a case where a flow rate of an exhaust gas is not decreased, a large amount of exhaust gas of low temperature passes through the oxidation catalyst 41 thus giving rise to a possibility that a temperature of the oxidation catalyst 41 is greatly lowered due to the exhaust gas. On the other hand, in the above-mentioned embodiment, by performing the first flow regulating control, a flow rate of an exhaust gas of low temperature which passes through the oxidation catalyst 41 is decreased and hence, it is possible to prevent the oxidation catalyst 41 from being cooled by the exhaust gas of low temperature whereby the oxidation catalyst 41 can be kept warm.

The above-mentioned temperature keeping effect of the oxidation catalyst 41 is expressed, for example, as the difference between behaviors indicated by graphs (f), (g) in the timing chart (FIG. 7) at the time of performing the first flow regulating control and behaviors indicated by graphs (f), (g) in the timing chart (FIG. 8) at the time of performing the second flow regulating control. That is, in the timing chart shown in FIG. 8 (in case of the second flow regulating control), during a period from a point of time t1 to a point of time t2 where deceleration fuel cut is performed, gas temperatures in front of and behind the oxidation catalyst 41 (that is, the DOC pre gas temperature and the DPF post gas temperature) T1, T2 indicated by the graphs (f), (g) are greatly lowered respectively. To the contrary, in the timing chart shown in FIG. 7 (in case of the first flow regulating control), during the period from the point of time t1 to the point of time t2 where the deceleration fuel cut is performed, the gas temperatures T1, T2 in front of and behind the oxidation catalyst 41 indicated by graphs (f), (g) are not lowered in a noticeable manner. This means that lowering of the temperature of the oxidation catalyst 41 is sufficiently suppressed.

On the other hand, in the case where the second temperature condition is established at the time of performing the deceleration fuel cut and it is confirmed that the oxidation catalyst 41 is warmed to some extent (shifted to an intermediate temperature state), due to the second flow regulating control, a flow rate of an exhaust gas is increased compared to the first flow regulating control and hence, a relatively warm exhaust gas obtained after the exhaust gas passes through the oxidation catalyst 41 can be introduced into the SCR catalyst 43 downstream of the oxidation catalyst 41 whereby the SCR catalyst 43 can be kept warm. For example, under the second temperature condition, assuming a case where a control equal to the control under the first temperature condition (that is, the first flow regulating control) is continuously performed, although the oxidation catalyst 41 can be kept warm, the SCR catalyst 43 which is disposed downstream of the oxidation catalyst 41 and is liable to be easily cooled due to the influence of traveling air or the like cannot be kept warm. To the contrary, in the above-mentioned embodiment, a flow rate of an exhaust gas which passes through the oxidation catalyst 41 and the SCR catalyst 43 can be increased due to the second flow regulating control and hence, heat accumulated in the oxidation catalyst 41 can be shifted to the SCR catalyst 43 by way of an exhaust gas and hence, the temperature difference between the oxidation catalyst 41 and the SCR catalyst 43 can be made small whereby lowering of the temperature of the SCR catalyst 43 can be suppressed.

The above-mentioned temperature keeping effect of the SCR catalyst 43 is expressed, for example, as the difference between the behavior indicated by the graph (h) shown in the timing chart (FIG. 8) at the time of performing the second flow regulating control and behavior indicated by the graph (h) shown in the timing chart (FIG. 7) at the time of performing the first flow regulating control. That is, in the timing chart shown in FIG. 7 (in the case of the first flow regulating control), during the period from the point of time t1 to the point of time t2 where deceleration fuel cut is performed, the exhaust gas temperature just in front of the SCR catalyst 43 (SCR pre gas temperature) T3 indicated by the graph (h) is greatly lowered. To the contrary, in the timing chart shown in FIG. 8 (in case of the second flow regulating control), during the period from the point of time t1 to the point of time t2 where the deceleration fuel cut is performed, the SCR pre gas temperature T3 indicated by the graph (h) is hardly lowered. This means that lowering of the temperature of the SCR catalyst 43 is sufficiently suppressed.

In the above-mentioned embodiment, in the case where a third temperature condition is established in which a DOC pre gas temperature T1 is equal to or above a first threshold value X at the time of performing the deceleration fuel cut, and it is confirmed that both the oxidation catalyst 41 and the SCR catalyst 43 are shifted to a high temperature state, a normal control (S18) which includes no flow rate regulation of the exhaust gas based on temperature states of the respective catalysts 41, 43 is performed. Accordingly, an opening degree of a flow rate regulating unit such as the throttle valve 33 or the like can be returned to an original opening degree at the time of performing deceleration fuel cut while ensuring a purifying performance of an exhaust gas by the oxidation catalyst 41 and the SCR catalyst 43.

In the above-mentioned embodiment, whether or not the first, the second, and the third temperature conditions are established is determined based on a DOC pre gas temperature T1 detected by the first exhaust temperature sensor SN5 and a DPF post gas temperature T2 detected by the second exhaust temperature sensor SN6. Accordingly, temperature states of the respective catalysts 41, 43 can be properly determined by a relatively simple method in which temperatures of the oxidation catalyst 41 and the SCR catalyst 43 are not directly detected.

Specifically, in the above-mentioned embodiment, when a DOC pre gas temperature T1 is below a first threshold value X and a DPF post gas temperature T2 is below a second threshold value Y, it is determined that a first temperature condition is established. When the DOC pre gas temperature T1 is below the first threshold value X and the DPF post gas temperature T2 is equal to or above the second threshold value Y, it is determined that the second temperature condition is established. When the DOC pre gas temperature T1 is equal to or above the first threshold value X, it is determined that a third temperature condition is established. With such a configuration, temperature states of the oxidation catalyst 41 and the SCR catalyst 43 (whether or not the first to third temperature conditions are established) can be easily and properly determined using one threshold value X and one threshold value Y prepared for each of the gas temperatures T1, T2.

Further, in the above-mentioned embodiment, in the case where it is confirmed that the oxidation catalyst 41 is in a low temperature state at the time of performing the deceleration fuel cut (the first temperature condition is established), as the above-mentioned first flow regulating control, a control is performed so as to lower an opening degree of the throttle valve 33 while maintaining the EGR valve 73 in a predetermined valve open state. Accordingly, by decreasing a flow rate of an exhaust gas (air) introduced from the intake passage 30 to the exhaust passage 40 and returning a portion of the exhaust gas into the intake passage 30, a flow rate of the exhaust gas which passes through the oxidation catalyst 41 can be effectively decreased and hence, the oxidation catalyst 41 can be kept warm.

On the other hand, in the second flow regulating control performed when the oxidation catalyst 41 is warmed to some extent (the second temperature condition is established), an opening degree of the throttle valve 33 is increased and an opening degree of the EGR valve 73 is decreased compared to the corresponding opening degrees at the time of performing the first flow regulating control and hence, a flow rate of an exhaust gas which passes through the oxidation catalyst 41 and the SCR catalyst 43 can be sufficiently increased whereby the SCR catalyst 43 can be kept warm.

(6) Modification

In the above-mentioned embodiment, at the time of performing the second flow regulating control (S17), an opening degree of the throttle valve 33 is increased compared to the opening degree of the throttle valve 33 at the time of performing the first flow regulating control (S16), and an opening degree of the EGR valve 73 is lowered compared to the opening degree of the EGR valve 73 at the time of the first flow regulating control. However, one of such opening-degree controls may be omitted. That is, in the second flow regulating control, the opening degree of the throttle valve 33 may be increased while maintaining the opening degree of the EGR valve 73 at the same level or the opening degree of the EGR valve 73 may be lowered while maintaining the opening degree of the throttle valve 33 at the same level. In the former case, the content of the second flow regulating control does not basically change from the content of the normal control (S18). In other words, in the present invention, it is sufficient that the second flow regulating control and the normal control be a control capable of increasing a flow rate of an exhaust gas compared to the first flow regulating control, and the second flow regulating control and the normal control may be the same or be different from each other.

Opposite to the above-mentioned case, it is sufficient that the first flow regulating control be a control capable of reducing a flow rate of an exhaust gas compared to the second flow regulating control and the normal control, and a specific method of realizing such a control is not limited to the method according to the above-mentioned embodiment. For example, in an engine having an openable and closable exhaust shutter valve in an exhaust passage 40, an operation of reducing an opening degree of the exhaust shutter valve may be performed as the first flow regulating control. The exhaust shutter valve used in this case corresponds to "control valve" in the claims.

In the above-mentioned embodiment, whether or not the first, the second, and the third temperature conditions expressing temperature states of the oxidation catalyst 41 and the SCR catalyst 43 are established is determined based on a detection value (DOC pre gas temperature T1) of the first exhaust temperature sensor SN5 which detects an exhaust gas temperature just in front of the oxidation catalyst 41, and a detection value (DPF post gas temperature T2) of the second exhaust temperature sensor SN6 which detects an exhaust gas temperature between the oxidation catalyst 41 and the SCR catalyst 43. However, a specific method of determining whether or not the respective temperature conditions are established is not limited to such a method. For example, in addition to the respective detection values (DOC pre gas temperature T1 and DPF post gas temperature T2) of the first and second exhaust temperature sensors SN5, SN6, a detection value (SCR pre gas temperature T3) of the third exhaust temperature sensor SN7 which detects an exhaust gas temperature just in front of the SCR catalyst 43 may be taken into consideration. In this case, whether or not the respective temperature conditions are established may be determined based on these three detection temperatures T1 to T3. For example, the determination may be made that the second temperature condition is established (that is, the oxidation catalyst 41 is in an intermediate temperature state and the SCR catalyst 43 is in a low temperature state) when the following three conditions are established. That is, (i) a DOC pre gas temperature T1 is below a threshold value (the first threshold value X in the embodiment), (ii) a DPF post gas temperature T2 is equal to or above a threshold value (the second threshold value Y in the embodiment), and (iii) an SCR pre gas temperature T3 is below a threshold value. The determination may be made that the first temperature condition is established (that is, both of the oxidation catalyst 41 and the SCR catalyst 43 are in a low temperature state) when the conditions (i), (iii) are established and the condition (ii) is not established.

Further, an additional exhaust temperature sensor may be provided for detecting a temperature of an exhaust gas which flows between the oxidation catalyst 41 and the DPF 42 (hereinafter referred to as DOC post gas temperature), and whether or not the respective temperature conditions are established may be determined using a detection value of the additional exhaust temperature sensor. For example, the determination may be made that the second temperature condition is established when the following three conditions are established. That is, (i) a DOC pre gas temperature T1 is below a threshold value, (ii) the DOC post gas temperature is equal to or above a threshold value, (iii) a DPF post gas temperature T2 is equal to or above a threshold value. The determination may be made that the first temperature condition is established when the condition (i) is established and one of conditions (ii), (iii) is not established.

Further, sensors which directly detect temperatures of the oxidation catalyst 41 and the SCR catalyst 43 may be provided, and whether or not the respective temperature conditions are established may be determined based on these detection values of the respective sensors.

In the above-mentioned embodiment, the description has been made with respect to the case where the exhaust purification device according to the present invention is applied to the diesel engine which ignites fuel containing light oil as a main component by compression. However, it is sufficient that an engine to which the present invention is applicable be an engine which requires the provision of an SCR catalyst for purifying NOx. For example, the present invention may be applied to a lean burn gasoline engine where fuel containing gasoline as a main component is burnt based on a lean air/fuel ratio.

(7) Summary

The above-mentioned embodiment is summarized as follows.

The exhaust purification device of an engine according to the embodiment includes: an exhaust passage through which an exhaust gas discharged from an engine body flows; an oxidation catalyst which is disposed in the exhaust passage and purifies HC and CO contained in the exhaust gas; a urea injector which is disposed in the exhaust passage downstream of the oxidation catalyst and supplies urea into the exhaust passage; an SCR catalyst which is disposed in the exhaust passage downstream of the urea injector and purifies NOx in the exhaust gas by a reduction action of ammonium produced from the urea; a control valve capable of regulating a flow rate of the exhaust gas which flows through the exhaust passage; and a controller which controls the urea injector and the control valve. The controller is configured to perform a first flow regulating control in which the control valve is controlled so as to decrease the flow rate of the exhaust gas which passes through the oxidation catalyst and the SCR catalyst in a case where a first temperature condition that the oxidation catalyst is in a low temperature state at the time of performing deceleration fuel cut for stopping supply of fuel into the engine body during deceleration is established, and the controller is configured to perform a second flow regulating control in which the control valve is controlled so as to increase the flow rate of the exhaust gas which passes through the oxidation catalyst and the SCR catalyst compared to the first flow regulating control in a case where a second temperature condition that the oxidation catalyst is in a temperature state higher than the low temperature state and the SCR catalyst is in a low temperature state at the time of performing the deceleration fuel cut is established.

According to the exhaust purification device, when the first temperature condition is established at the time of performing the deceleration fuel cut and it is confirmed that the oxidation catalyst is in a low temperature state, a flow rate of an exhaust gas is decreased by the first flow regulating control. Accordingly, it is possible to prevent flowing of a large amount of an exhaust gas of a low temperature into the oxidation catalyst and hence, lowering of a temperature of the oxidation catalyst due to the exhaust gas can be suppressed. Specifically, a burnt gas of high temperature is not contained in an exhaust gas at the time of performing deceleration fuel cut and hence, the temperature of the exhaust gas is lowered naturally. Particularly, under the first temperature condition in which the oxidation catalyst is in a low temperature state, a temperature of a wall surface of the exhaust passage is low as a matter of course. Accordingly, assuming a case where a flow rate of an exhaust gas is not decreased, a large amount of exhaust gas of low temperature passes through the oxidation catalyst thus giving rise to a possibility that a temperature of the oxidation catalyst is greatly lowered due to the exhaust gas. On the other hand, in the device of the present invention, by performing the first flow regulating control, a flow rate of an exhaust gas of low temperature which passes through the oxidation catalyst is decreased and hence, it is possible to prevent the oxidation catalyst from being cooled by the exhaust gas of low temperature whereby the oxidation catalyst can be kept warm.

On the other hand, in the case where the second temperature condition is established at the time of performing the deceleration fuel cut and it is confirmed that the oxidation catalyst is warmed to some extent, due to the second flow regulating control, a flow rate of an exhaust gas is increased compared to the first flow regulating control and hence, a relatively warm exhaust gas obtained after the exhaust gas passes through the oxidation catalyst can be introduced into the SCR catalyst downstream of the oxidation catalyst whereby the SCR catalyst can be kept warm. For example, under the second temperature condition, assuming a case where a control equal to the control under the first temperature condition (that is, the first flow regulating control) is continuously performed, although the oxidation catalyst can be kept warm, the SCR catalyst which is disposed downstream of the oxidation catalyst and is liable to be easily cooled due to the influence of traveling air or the like cannot be kept warm. To the contrary, in the device of the present invention, a flow rate of an exhaust gas which passes through the oxidation catalyst and the SCR catalyst can be increased due to the second flow regulating control and hence, heat accumulated in the oxidation catalyst can be shifted to the SCR catalyst by way of an exhaust gas and hence, the temperature difference between the oxidation catalyst and the SCR catalyst can be made small whereby lowering of the temperature of the SCR catalyst can be suppressed.

It is preferable that the controller be configured to perform a normal control which includes no flow rate regulation of the exhaust gas in response to respective temperature states of the respective catalysts in a case where a third temperature condition that both the oxidation catalyst and the SCR catalyst are at a temperature state higher than the low temperature state at the time of performing the deceleration fuel cut is established.

With such a configuration, an opening degree of the control valve can be returned to an original opening degree at the time of performing deceleration fuel cut while ensuring a purifying performance of an exhaust gas by the oxidation catalyst and the SCR catalyst.

In the above-mentioned configuration, it is more preferable that the exhaust purification device further includes: a first exhaust temperature sensor which detects a temperature of the exhaust gas which flows upstream of the oxidation catalyst; and a second exhaust temperature sensor which detects the temperature of the exhaust gas which flows between the oxidation catalyst and the SCR catalyst. The controller is configured to determine the temperature state of the oxidation catalyst and the temperature state of the SCR catalyst based on respective detection temperatures of the first and second exhaust temperature sensors.

With such a configuration, temperature states of the respective catalysts can be properly determined by a relatively simple method in which temperatures of the oxidation catalyst and the SCR catalyst are not directly detected.

In the above-mentioned configuration, it is more preferable that the controller be configured to determine that the first temperature condition is established in a case where the detection temperature of the first exhaust temperature sensor is below a preset first threshold value and the detection temperature of the second exhaust temperature sensor is below a preset second threshold value, the controller be configured to determine that the second temperature condition is established in a case where the detection temperature of the first exhaust temperature sensor is below the first threshold value and the detection temperature of the second exhaust temperature sensor is equal to or above the second threshold value, and the controller be configured to determine that the third temperature condition is established in a case where the detection temperature of the first exhaust temperature sensor is equal to or above the first threshold value.

With such a configuration, temperature states of the oxidation catalyst and the SCR catalyst (whether or not the first to third temperature conditions are established) can be easily and properly determined using threshold values (first and second threshold values) which are prepared for detection temperatures of the first and second exhaust temperature sensors respectively.

It is preferable that the engine include an intake passage through which air introduced into the engine body flows, the control valve be a throttle valve openably and closably disposed in the intake passage, and the controller be configured to lower an opening degree of the throttle valve at the time of performing the first flow regulating control.

In this manner, in the case where an opening degree of the throttle valve is lowered at the time of performing the first flow regulating control, by decreasing a flow rate of an exhaust gas (air) introduced from the intake passage to the exhaust passage, a flow rate of the exhaust gas which passes through the oxidation catalyst can be decreased. Accordingly, the oxidation catalyst can be kept warm.

In the above-mentioned configuration, it is more preferable that the engine include: an EGR passage which makes the intake passage and the exhaust passage communicate with each other; and an EGR valve disposed openably and closably in the EGR passage, and the controller be configured to bring the EGR valve into a valve open state at the time of performing the first flow regulating control.

In this manner, when the EGR valve is brought into a valve open state at the time of performing the first flow regulating control, a portion of an exhaust gas discharged to the exhaust passage is returned to the intake passage through the EGR passage and hence, a flow rate of the exhaust gas which passes through the oxidation catalyst can be decreased more effectively.

In the above-mentioned configuration, it is more preferable that the controller be configured to lower an opening degree of the EGR valve without lowering the opening degree of the throttle valve at the time of performing the second flow regulating control.

With such a configuration, a flow rate of an exhaust gas can be more sufficiently increased by the second flow regulating control compared to the first flow regulating control.

This embodiment also relates to the vehicle engine capable of purifying an exhaust gas and mounted on a vehicle. The vehicle engine includes: an engine body; a fuel injection valve which supplies fuel into the engine body; an intake passage through which air introduced into the engine body flows; an exhaust passage through which an exhaust gas discharged from the engine body flows; an EGR passage which makes the intake passage and the exhaust passage communicate with each other; a throttle valve disposed openably and closably in the intake passage; an EGR valve disposed openably and closably in the EGR passage; an oxidation catalyst which is disposed in the exhaust passage and purifies HC and CO contained in the exhaust gas; a urea injector which is disposed in the exhaust passage downstream of the oxidation catalyst and supplies urea into the exhaust passage; an SCR catalyst which is disposed in the exhaust passage downstream of the urea injector and purifies NOx in the exhaust gas by a reduction action of ammonium produced from the urea; and a controller which controls the fuel injection valve, the throttle valve, the EGR valve, and the urea injector. The controller is configured to perform deceleration fuel cut for stopping supply of the fuel by the fuel injection valve during deceleration in which an opening degree of an accelerator pedal of a vehicle is set to zero, the controller is configured to perform a first flow regulating control in which an opening degree of the throttle valve is lowered compared to the opening degree of the throttle valve immediately before starting of the deceleration fuel cut in a case where a first temperature condition that the oxidation catalyst is in a low temperature state at the time of performing the deceleration fuel cut is established, and the controller is configured to perform a second flow regulating control in which an opening degree of the EGR valve is lowered compared to the opening degree of the EGR valve immediately before starting of the deceleration fuel cut in a case where a second temperature condition that the oxidation catalyst is in a temperature state higher than the low temperature state and the SCR catalyst is in a low temperature state at the time of performing the deceleration fuel cut is established.

According to this vehicle engine, the first flow regulating control for lowering an opening degree of the throttle valve is performed in the case where the first temperature condition is established at the time of performing the deceleration fuel cut and it is confirmed that the oxidation catalyst is in a low temperature state. Accordingly, it is possible to prevent a large amount of an exhaust gas of a low temperature from flowing into the oxidation catalyst and hence, lowering of a temperature of the oxidation catalyst by the exhaust gas can be suppressed. Further, the second flow regulating control for lowering an opening degree of the EGR valve is performed in the case where the second temperature condition is established at the time of performing the deceleration fuel cut and it is confirmed that the oxidation catalyst is warmed to some extent. Accordingly, a flow rate of the exhaust gas in the second flow regulating control can be increased compared to the first flow regulating control and hence, a relatively warm exhaust gas obtained after the exhaust gas is made to pass through the oxidation catalyst is introduced into the SCR catalyst disposed downstream of the oxidation catalyst thus keeping the SCR catalyst warm.

In the vehicle engine, it is preferable that the controller be configured to maintain the opening degree of the EGR valve at the same opening degree as the opening degree immediately before starting the deceleration fuel cut at the time of performing the first flow regulating control, and the controller be configured to maintain the opening degree of the throttle valve at the same opening degree as the opening degree immediately before starting the deceleration fuel cut at the time of performing the second flow regulating control.

With such a configuration, this embodiment can acquire both an effect of decreasing an exhaust gas by the first flow regulating control and an effect of increasing an exhaust gas by the second flow regulating control sufficiently.

This embodiment also relates to a method for controlling an engine which includes: an engine body; a fuel injection valve which supplies fuel into the engine body; an exhaust passage through which an exhaust gas discharged from the engine body flows; an oxidation catalyst which is disposed in the exhaust passage and purifies HC and CO contained in the exhaust gas; a urea injector which is disposed in the exhaust passage downstream of the oxidation catalyst and supplies urea into the exhaust passage; an SCR catalyst which is disposed in the exhaust passage downstream of the urea injector and purifies NOx in the exhaust gas by a reduction action of ammonium produced from the urea; and a control valve capable of regulating a flow rate of the exhaust gas which flows through the exhaust passage. The method includes the steps of: performing deceleration fuel cut for stopping supply of the fuel by the fuel injection valve during deceleration; controlling the control valve so as to decrease a flow rate of the exhaust gas which passes through the oxidation catalyst and the SCR catalyst in a case where a first temperature condition that the oxidation catalyst is in a low temperature state at the time of performing the deceleration fuel cut is established; and controlling the control valve so as to increase the flow rate of the exhaust gas which passes through the oxidation catalyst and the SCR catalyst, compared to the case where the first temperature condition is established, in a case where a second temperature condition that the oxidation catalyst is in a temperature state higher than the low temperature state and the SCR catalyst is in a low temperature state at the time of performing the deceleration fuel cut is established.

With such a method, in the same manner as the above-mentioned exhaust purification device or the vehicle engine, lowering of temperatures of the oxidation catalyst and the SCR catalyst at the time of performing deceleration fuel cut can be effectively suppressed.

This application is based on Japanese Patent application No. 2017-182187 filed in Japan Patent Office on Sep. 22, 2017, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An exhaust purification device of an engine comprising:
    an exhaust passage through which an exhaust gas discharged from an engine body flows;
    an oxidation catalyst which is disposed in the exhaust passage and purifies HC and CO contained in the exhaust gas;
    a urea injector which is disposed in the exhaust passage downstream of the oxidation catalyst and supplies urea into the exhaust passage;
    an SCR catalyst which is disposed in the exhaust passage downstream of the urea injector and purifies NOx in the exhaust gas by a reduction action of ammonium produced from the urea;
    a first exhaust temperature sensor which detects a temperature of the exhaust gas which flows upstream of the oxidation catalyst;
    a second exhaust temperature sensor which detects the temperature of the exhaust gas which flows between the oxidation catalyst and the SCR catalyst;
    a control valve capable of regulating a flow rate of the exhaust gas which flows through the exhaust passage; and
    a controller which controls the urea injector and the control valve, wherein the controller is configured to perform a first flow regulating control in which the control valve is controlled so as to decrease the flow rate of the exhaust gas which passes through the oxidation catalyst and the SCR catalyst in a case where a first temperature condition that the oxidation catalyst is in a low temperature state at the time of performing deceleration fuel cut for stopping supply of fuel into the engine body during deceleration is established, the controller is configured to perform a second flow regulating control in which the control valve is controlled so as to increase the flow rate of the exhaust gas which passes through the oxidation catalyst and the SCR catalyst compared to the first flow regulating control in a case where a second temperature condition that the oxidation catalyst is in a temperature state higher than the low temperature state and the SCR catalyst is in a low temperature state at the time of performing the deceleration fuel cut is established, the controller is configured to perform a normal control which includes no flow rate regulation of the exhaust gas in response to respective temperature states of the respective catalysts in a case where a third temperature condition that both the oxidation catalyst and the SCR catalyst are at a temperature state higher than the low temperature state at the time of performing the deceleration fuel cut is established, the controller is configured to determine that the first temperature condition is established in a case where the detection temperature of the first exhaust temperature sensor is below a preset first threshold value and the detection temperature of the second exhaust temperature sensor is below a preset second threshold value, the controller is configured to determine that the second temperature condition is established in a case where the detection temperature of the first exhaust temperature sensor is below the first threshold value and the detection temperature of the second exhaust temperature sensor is equal to or above the second threshold value, and the controller is configured to determine that the third temperature condition is established in a case where the detection temperature of the first exhaust temperature sensor is equal to or above the first threshold value.

2. The exhaust purification device of an engine according to claim 1, wherein the engine includes an intake passage through which air introduced into the engine body flows, the control valve is a throttle valve openably and closably disposed in the intake passage, and the controller is configured to lower an opening degree of the throttle valve at the time of performing the first flow regulating control.

3. The exhaust purification device of an engine according to claim 2, wherein the engine includes: an EGR passage which makes the intake passage and the exhaust passage communicate with each other; and an EGR valve disposed openably and closably in the EGR passage, and the controller is configured to bring the EGR valve into a valve open state at the time of performing the first flow regulating control.

4. The exhaust purification device of an engine according to claim 3, wherein the controller is configured to lower an opening degree of the EGR valve without lowering the opening degree of the throttle valve at the time of performing the second flow regulating control.

5. A vehicle engine capable of purifying an exhaust gas and mounted on a vehicle, the vehicle engine comprising:

an engine body;

a fuel injection valve which supplies fuel into the engine body;

an intake passage through which air introduced into the engine body flows;

an exhaust passage through which an exhaust gas discharged from the engine body flows;

an EGR passage which makes the intake passage and the exhaust passage communicate with each other;

a throttle valve disposed openably and closably in the intake passage;

an EGR valve disposed openably and closably in the EGR passage;

an oxidation catalyst which is disposed in the exhaust passage and purifies HC and CO contained in the exhaust gas;

a urea injector which is disposed in the exhaust passage downstream of the oxidation catalyst and supplies urea into the exhaust passage;

an SCR catalyst which is disposed in the exhaust passage downstream of the urea injector and purifies NOx in the exhaust gas by a reduction action of ammonium produced from the urea;

a first exhaust temperature sensor which detects a temperature of the exhaust gas which flows upstream of the oxidation catalyst;

a second exhaust temperature sensor which detects the temperature of the exhaust gas which flows between the oxidation catalyst and the SCR catalyst, and a controller which controls the fuel injection valve, the throttle valve, the EGR valve, and the urea injector, wherein the controller is configured to perform deceleration fuel cut for stopping supply of the fuel by the fuel injection valve during deceleration in which an opening degree of an accelerator pedal of a vehicle is set to zero, the controller is configured to perform a first flow regulating control in which an opening degree of the throttle valve is lowered compared to the opening degree of the throttle valve immediately before starting of the deceleration fuel cut in a case where a first temperature condition that the oxidation catalyst is in a low temperature state at the time of performing the deceleration fuel cut is established, the controller is configured to perform a second flow regulating control in which an opening degree of the EGR valve is lowered compared to the opening degree of the EGR valve immediately before starting of the deceleration fuel cut in a case where a second temperature condition that the oxidation catalyst is in a temperature state higher than the low temperature state and the SCR catalyst is in a low temperature state at the time of performing the deceleration fuel cut is established, the controller is configured to perform a normal control which includes no flow rate regulation of the exhaust gas in response to respective temperature states of the respective catalysts in a case where a third temperature condition that both the oxidation catalyst and the SCR catalyst are at a temperature state higher than the low temperature state at the time of performing the deceleration fuel cut is established, the controller is configured to determine that the first temperature condition is established in a case where the detection temperature of the first exhaust temperature sensor is below a preset first threshold value and the detection temperature of the second exhaust temperature sensor is below a preset second threshold value, the controller is configured to determine that the second temperature condition is established in a case where the detection temperature of the first exhaust temperature sensor is below the first threshold value and the detection temperature of the second exhaust temperature sensor is equal to or above the second threshold value, and the controller is configured to determine that the third temperature condition is established in a case where the detection temperature of the first exhaust temperature sensor is equal to or above the first threshold value.

6. The vehicle engine according to claim 5, wherein the controller is configured to maintain the opening degree of the EGR valve at the same opening degree as the opening degree immediately before starting the deceleration fuel cut at the time of performing the first flow regulating control.

7. The vehicle engine according to claim 5, wherein the controller is configured to maintain the opening degree of the throttle valve at the same opening degree as the opening degree immediately before starting the deceleration fuel cut at the time of performing the second flow regulating control.

8. A method for controlling an engine which includes:
an engine body;
a fuel injection valve which supplies fuel into the engine body;
an exhaust passage through which an exhaust gas discharged from the engine body flows;
an oxidation catalyst which is disposed in the exhaust passage and purifies HC and CO contained in the exhaust gas;
a urea injector which is disposed in the exhaust passage downstream of the oxidation catalyst and supplies urea into the exhaust passage;
an SCR catalyst which is disposed in the exhaust passage downstream of the urea injector and purifies NOx in the exhaust gas by a reduction action of ammonium produced from the urea;
a first exhaust temperature sensor which detects a temperature of the exhaust gas which flows upstream of the oxidation catalyst;
a second exhaust temperature sensor which detects the temperature of the exhaust gas which flows between the oxidation catalyst and the SCR catalyst, and
a control valve capable of regulating a flow rate of the exhaust gas which flows through the exhaust passage, the method comprising the steps of:
performing deceleration fuel cut for stopping supply of the fuel by the fuel injection valve during deceleration;
controlling the control valve so as to decrease a flow rate of the exhaust gas which passes through the oxidation catalyst and the SCR catalyst in a case where a first temperature condition that the oxidation catalyst is in a low temperature state at the time of performing the deceleration fuel cut is established;
controlling the control valve so as to increase the flow rate of the exhaust gas which passes through the oxidation catalyst and the SCR catalyst, compared to the case where the first temperature condition is established, in a case where a second temperature condition that the oxidation catalyst is in a temperature state higher than the low temperature state and the SCR catalyst is in a low temperature state at the time of performing the deceleration fuel cut is established; and
performing a normal control which includes no flow rate regulation of the exhaust gas in response to respective temperature states of the respective catalysts in a case where a third temperature condition that both the oxidation catalyst and the SCR catalyst are at a temperature state higher than the low temperature state at the time of performing the deceleration fuel cut is established,
wherein the first temperature condition is established in a case where the detection temperature of the first exhaust temperature sensor is below a preset first threshold value and the detection temperature of the second exhaust temperature sensor is below a preset second threshold value,
the second temperature condition is established in a case where the detection temperature of the first exhaust temperature sensor is below the first threshold value and the detection temperature of the second exhaust temperature sensor is equal to or above the second threshold value, and
the third temperature condition is established in a case where the detection temperature of the first exhaust temperature sensor is equal to or above the first threshold value.

\* \* \* \* \*